United States Patent
Chow et al.

(10) Patent No.: US 10,402,579 B2
(45) Date of Patent: *Sep. 3, 2019

(54) SYSTEMS, METHODS, AND APPARATUS TO PROVIDE PRIVATE INFORMATION RETRIEVAL

(71) Applicant: Intel Corporation, Santa Clara, CA (US)

(72) Inventors: Richard Chow, Sunnyvale, CA (US); Edward Wang, Seattle, WA (US); Vinay Phegade, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/897,990

(22) Filed: Feb. 15, 2018

(65) Prior Publication Data

US 2018/0173888 A1 Jun. 21, 2018

Related U.S. Application Data

(63) Continuation of application No. 14/665,064, filed on Mar. 23, 2015, now Pat. No. 9,904,793.

(51) Int. Cl.
*G06F 21/62* (2013.01)
*H04L 29/06* (2006.01)
(Continued)

(52) U.S. Cl.
CPC .......... *G06F 21/6218* (2013.01); *G06F 16/22* (2019.01); *G06F 16/278* (2019.01);
(Continued)

(58) Field of Classification Search
CPC ..... G06F 3/0655; G06F 3/0683; G06F 3/0622
See application file for complete search history.

(56) References Cited

U.S. PATENT DOCUMENTS 5,553,145 A 9/1996 Micali
5,884,270 A * 3/1999 Walker ............... G06Q 10/1053
705/321

(Continued)

OTHER PUBLICATIONS

Lu et al., "Trust-Based Privacy Preservation for Peer-to-Peer Data Sharing" Special Issue Correspondence, IEEE Transactions on Systems, Man, and Cybernetics-Part A: Systems and Humans, vol. 36, No. 3, May 2006, pp. 798-502.*

(Continued)

*Primary Examiner* — Harunur Rashid
(74) *Attorney, Agent, or Firm* — Hanley, Flight & Zimmerman, LLC

(57) ABSTRACT

Systems, methods, and apparatus to provide private information retrieval are disclosed. An example apparatus includes a protected data enclave to store a first portion of data such that entities other than the first trusted hardware processing unit are unable to access the first portion of the data. The example apparatus includes a request processor to determine that a data element specified in a first request from an entity is stored in a second trusted hardware processing unit. The request processor is to send an encrypted request for the data element to the second trusted hardware processing unit, and send an encrypted dummy request to a third trusted hardware processing unit. The request processor is to determine whether an encrypted dummy response has been received from the third trusted hardware processing unit, and whether an encrypted response including the data element has been received from the second trusted hardware processing unit.

20 Claims, 10 Drawing Sheets

(51) Int. Cl.
G06F 16/22 (2019.01)
G06F 21/57 (2013.01)
G06F 16/901 (2019.01)
G06F 16/27 (2019.01)

(52) U.S. Cl.
CPC .......... *G06F 16/9027* (2019.01); *G06F 21/57* (2013.01); *G06F 21/6227* (2013.01); *G06F 21/6263* (2013.01); *H04L 63/0428* (2013.01); *H04L 63/102* (2013.01); *G06F 2221/2123* (2013.01)

(56) References Cited

U.S. PATENT DOCUMENTS

| | | | |
|---|---|---|---|
| 9,904,793 | B2 | 2/2018 | Chow et al. |
| 2004/0128378 | A1* | 7/2004 | Blakley, III ............ G06F 21/41 709/224 |
| 2006/0242574 | A1 | 10/2006 | Richardson et al. |
| 2010/0153704 | A1 | 6/2010 | Winslow |
| 2011/0276597 | A1 | 11/2011 | Little |
| 2013/0145455 | A1 | 6/2013 | Vijayshankar et al. |
| 2013/0268509 | A1 | 10/2013 | O'Neill |
| 2013/0305122 | A1 | 11/2013 | Sutardja |
| 2013/0312117 | A1 | 11/2013 | Sapp, II et al. |
| 2014/0195736 | A1 | 7/2014 | Tu et al. |
| 2016/0283731 | A1 | 9/2016 | Chow et al. |

OTHER PUBLICATIONS

Lorch et al., "Shroud: Ensuring Private Access to Large-Scale Data in the Data Center," Feb. 12-15, 2013, 15 pages, 11th USENIX Conference on File and Storage Technologies (FAST '13).
Stefanov et al., "Path ORAM: An Extremely Simple Oblivious RAM Protocol," Feb. 23, 2012, 25 pages.
"Private information retrieval," https://en.wikipedia.org/wiki/Private_information_retrieval, retrieved on Feb. 10, 2015, 5 pages.
"Software Guard Extensions Programming Reference," Sep. 2013, 156 pages, Intel.
International Searching Authority, "International Search Report and Written Opinion," issued in connection with International Patent Application No. PCT/US2016/016361, dated May 16, 2016 (12 pages).
International Bureau, "International Preliminary Report on Patentability," issued in connection with International Patent Application No. PCT/US2016/016361, dated Sep. 26 2017, 8 pages.
United States Patent and Trademark Office, Non-final Office Action issued in connection with U.S. Appl. No. 14/665,064 dated Jun. 3, 2016, 30 pages.
United States Patent and Trademark Office, Non-final Office Action issued in connection with U.S. Appl. No. 14/665,064 dated Jun. 8, 2017, 19 pages.
United States Patent and Trademark Office, Final Office Action issued in connection with U.S. Appl. No. 14/665,064 dated Nov. 17, 2016, 26 pages.
United States Patent and Trademark Office, Notice of Allowance issued in connection with U.S. Appl. No. 14/665,064 dated Oct. 17, 2017, 36 pages.
United States Patent and Trademark Office, Corrected Notice of Allowability issued in connection with U.S. Appl. No. 14/665,064 dated Nov. 15, 2017, 23 pages.
"Extended European Search Report," issued by the European Patent Office on Jul. 4, 2018, in connection with European Patent Application No. EP16769202 (9 pages).
M. Tamer et al., "Principles of Distributed Database Systems—Chapter 16—Peer-to-Peer Data Management," Principles of Distributed Database Systems, Third Edition, Mar. 2011, Springer New York, New York, Ny (48 pages).
J. Shashank et al., "Private Content Based Image Retrieval," Computer Vision and Pattern Recognition, IEEE Conference, Piscataway, NJ, Jun. 23, 2008 (8 pages).
Lu et al., "Trust-Based Privacy Preservation for Peer-to-Peer Data Sharing," IEEE Transactions on Systems, Man, and Cybernetics—Part A: Systems and Humans, vol. 36, No.3, May 3, 2006 (5 pages).

* cited by examiner

SYSTEMS, METHODS, AND APPARATUS TO PROVIDE PRIVATE INFORMATION RETRIEVAL

RELATED APPLICATIONS

This patent arises from a continuation of U.S. patent application Ser. No. 14/665,064, filed Mar. 23, 2015, and entitled "SYSTEMS, METHODS, AND APPARATUS TO PROVIDE PRIVATE INFORMATION RETRIEVAL." U.S. patent application Ser. No. 14/665,064 is hereby incorporated herein by reference in its entirety. Priority to U.S. patent application Ser. No. 14/665,064 is claimed.

FIELD OF THE DISCLOSURE

This disclosure relates generally to network security, and, more particularly, to systems, methods, and apparatus to provide private information retrieval.

BACKGROUND

Users access database records from servers by making requests, typically via a communications network such as the Internet. The servers and/or database records may be controlled by an entity other than the person making the request.

BRIEF DESCRIPTION OF THE DRAWINGS

The figures are not to scale. Wherever appropriate, the same or similar reference numbers will be used throughout the drawing(s) and accompanying written description to refer to the same or like parts.

DETAILED DESCRIPTION

Figure 1:
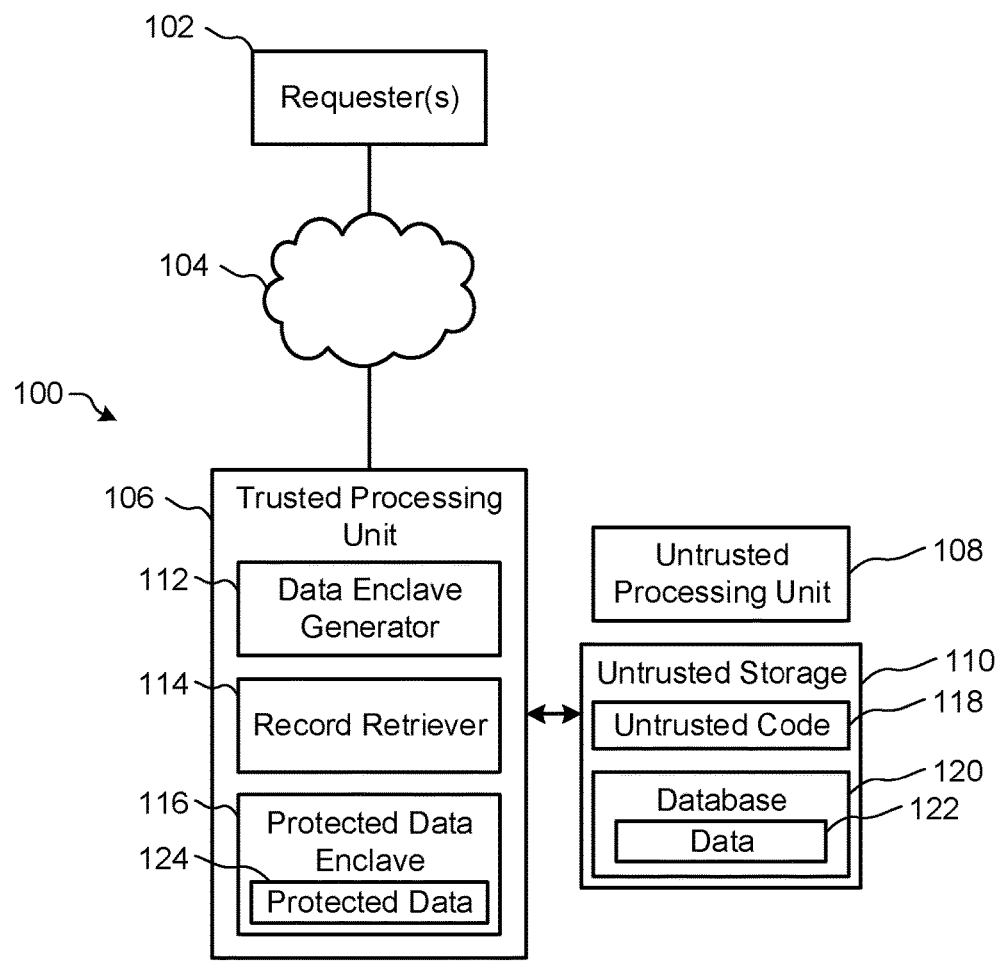
FIG. 1 is a block diagram of an example system constructed in accordance with the teachings of this disclosure to provide private information retrieval using a trusted processing unit.

Private Information Retrieval (PIR) allows a user to retrieve an item from a database server without revealing to the server which item was retrieved. An example is a private DNS server (e.g., a database including a simple table of DNS hostnames and IP addresses) that returns the IP address corresponding to the hostname without knowing which hostname is specified in the query and without knowing which IP address is being returned.

Known solutions to PIR include: 1) returning the entire database to the requesting client; 2) using cryptographic solutions; and 3) using trusted co-processors executing an oblivious random access memory (ORAM) protocol. All three known solutions are currently impractical, because they require unacceptably high query latencies and/or transfer bandwidths. Returning the entire database to the requesting client is impractical due to network constraints, and becomes even less practical as the database grows larger. The use of cryptographic solutions is also impractical due to a high computational requirement and resulting query latency. While more practical than the other two known techniques, currently known ORAM protocols also suffer from relatively high query latencies and are restricted to a single user.

Examples disclosed herein utilize trusted processing units that can protect large amounts of memory to provide private information retrieval for databases. In disclosed examples, the database to be queried is copied into one or more protected data enclaves that are protected by corresponding trusted processing units. In examples in which the database size is less than a maximum memory size that is protectable by a trusted processing unit, one trusted processing unit may be used to provide the private information retrieval for the database.

In other examples, in which the database size is more than the maximum memory size that is protectable by one trusted processing unit, the database is split into multiple protected data enclaves that are protected by corresponding trusted processing units. In some examples, the multiple protected data enclaves are arranged in a tree structure, where the protected data enclaves are the leaf nodes. In the tree structure, trusted processing units that implement protected hashing enclaves are the branch nodes. The protected hashing enclaves store data indicating paths through the tree structure where any of the records in the database may be found (e.g., indicating which the protected data enclaves (and the corresponding trusted processing unit) stores a requested record).

As used herein, the term "accessible," as it is applied to stored data or records, refers to the quality of being readable in plaintext form (i.e., unencrypted), as opposed to only being readable in ciphertext form (i.e., encrypted form). Data or records may be accessible to an entity even if the data is stored in encrypted form provided the entity is capable of promptly decrypting the data (e.g., the entity has the decryption key) without resorting to encryption cracking methods such as brute force, dictionary-based attacks, or other cracking methods. In other words, if data or records are "accessible" to an entity, the entity can understand or obtain the data or records even if the data or records are stored in encrypted form by possessing the corresponding encryption key and decryption algorithm. Conversely, if an entity may not have access to data even if the entity is capable of determining the sequence of bits and/or bytes that are physically stored, if the entity is not able to determine the plaintext or unencrypted data.

While examples herein respond to requests for access to data in a database, the requests do not result in actual querying of the database itself, because such querying would permit the owner of the database to know what data was accessed. Instead, copies of the data from the database are used to provide the requested data.

Examples disclosed herein improve the request latency for providing private information retrieval without reducing the security of the data retrieval. Thus, examples disclosed herein reduce the processing resources spent by requesters while waiting for responses to private information retrieval requests. Relative to some known private information retrieval solutions, examples disclosed herein conserve bandwidth by reducing the amount of transferred data to only transfer the records that are requested (rather than an entire database). Furthermore, relative to some other known private information retrieval solutions, examples disclosed herein use fewer processing resources and/or bandwidth to retrieve the requested data and to provide the requested data to the requester (rather than spending a large number of processing resources performing ORAM techniques).

FIG. 1 is a block diagram of an example system 100 to provide private information retrieval using a trusted processing unit. The example system 100 of FIG. 1 receives and responds to requests for data from one or more requesters 102. In the example of FIG. 1, the system 100 communicates with the requester(s) via a communications network 104, such as the Internet. Example system 100 of FIG. 1 may include, but are not limited to, one or more personal computers, servers, notebook computers, mobile communication devices (e.g., cellular handset, smartphone, etc.), and/or any other computing device and/or combination of computing devices. The data may include any content and/or may be stored in any format. Requests for data (and their corresponding responses) may comply with any past, present, and/or future communications protocols, such as hypertext transfer protocol (HTTP) or HTTP Secure (HTTPS).

The example system 100 of FIG. 1 includes a trusted processing unit 106, an untrusted processing unit 108, and untrusted storage 110. In some examples, the trusted processing unit 106 and the untrusted processing unit 108 are implemented in a same processor or processing device. For example, the trusted processing unit 106 may be implemented by instantiating a trusted execution environment within a processor. An example trusted execution environment may be created using the Software Guard Extensions (SGX) instruction set from Intel® Corporation. In some other examples, the trusted processing unit 106 is a different processor than the untrusted processing unit 108.

The example trusted processing unit 106 of FIG. 1 includes a data enclave generator 112, a record retriever 114, and a protected data enclave 116. The example untrusted storage 110 stores untrusted code 118 and a database 120 containing data 122 that is desired to be accessed by the requester(s) 102.

In the example of FIG. 1, the requester(s) 102 desire to privately access data from the database 120, but do not trust the untrusted code 118. Thus, the requester(s) 102 desire private information retrieval, in which the requester(s) may access one or more records without the untrusted processing unit 108 or the untrusted code being able to discern or infer the records being accessed. For example, the requester(s) 102 may be concerned that the untrusted code 118 may contain software that could attempt to profile them for undesired marketing purposes and/or to use knowledge of the queries and/or accessed records for more nefarious purposes. Therefore, the requester(s) 102 desire for the untrusted processing unit 108 to not have access to the contents of the request(s) and/or to not have access to the record(s) that are accessed and/or provided to the requester(s) 102 in response to the request(s).

As described in more detail below, the trusted processing unit 106 constructs the protected data enclave 116 to contain the data 122 stored in the database 120, receives request(s) from the requester(s) 102, and provides the requested data to the requester(s) 102 without the untrusted processing unit 108 (which may be executing the untrusted code 118) having access to the request or having access to the data sent to the requester(s) 102 in response to the request.

The example trusted processing unit 106 of FIG. 1 executes trusted code (e.g., code that is trusted to not be modified from a set of understood functions) to implement the data enclave generator 112 and/or the record retriever 114. In some other examples, the data enclave generator 112 and/or the record retriever 114 are implemented using hardware (e.g., the data enclave generator 112 and/or the record retriever 114 are essentially incapable of modifications to their functions, whether desired or undesired). Trust of the data enclave generator 112 and/or the record retriever 114 may be established by checking a hash or signature of computer code implementing the data enclave generator 112 and/or the record retriever 114 against a known trusted hash or signature.

The example data enclave generator 112 of FIG. 1 generates the protected data enclave 116 to store protected data 124. The protected data 124 is a copy of the data 122 in the database 120 that has been protected from access by unauthorized (e.g., untrusted) entities. The example trusted processing unit 106 implements the protected data enclave 116 in a protected memory (e.g., a storage device such as RAM). In some examples, the trusted processing unit 106 protects the protected data 124 in a memory by encrypting the data 122 obtained from the database 120 and storing only the protected data 124 in an untrusted memory such as the untrusted storage 110. When encrypted, the untrusted processing unit 108 cannot access the protected data 124. The example trusted processing unit 106 also prevents the untrusted processing unit 108 from determining which portions of the protected data 124 are being accessed by the trusted processing unit 106.

The example record retriever 114 of FIG. 1 receives requests from the requester(s) 102 via the network 104. The record retriever 114 processes the request to determine one or more records in the protected data enclave 116. For example, if the request received from the requester 102 is a request for specific, identifiable records (e.g., record identifiers), the record retriever 114 accesses the identified records in the protected data 124. Additionally or alternatively, if the request is a query for records based on a set of criteria, the example record retriever 114 determine which of the records in the protected data enclave 116 satisfy the query. The record retriever 114 returns the records to the requester 102 via the network.

In the example of FIG. 1, the untrusted processing unit 108 is not capable of accessing or monitoring the record requests by the record retriever 114 to the protected data enclave 116. Additionally, requests from the requesters 102 and responses from the record retriever 114 are encrypted to prevent access and/or monitoring of the request and response by the untrusted processing unit 108. By eliminating the means by which the untrusted processing unit 108 can monitor or infer the records being accessed by the requester(s) 102, the example trusted processing unit 106 provides private information retrieval for the data 122 in the database 120.

Figure 2:
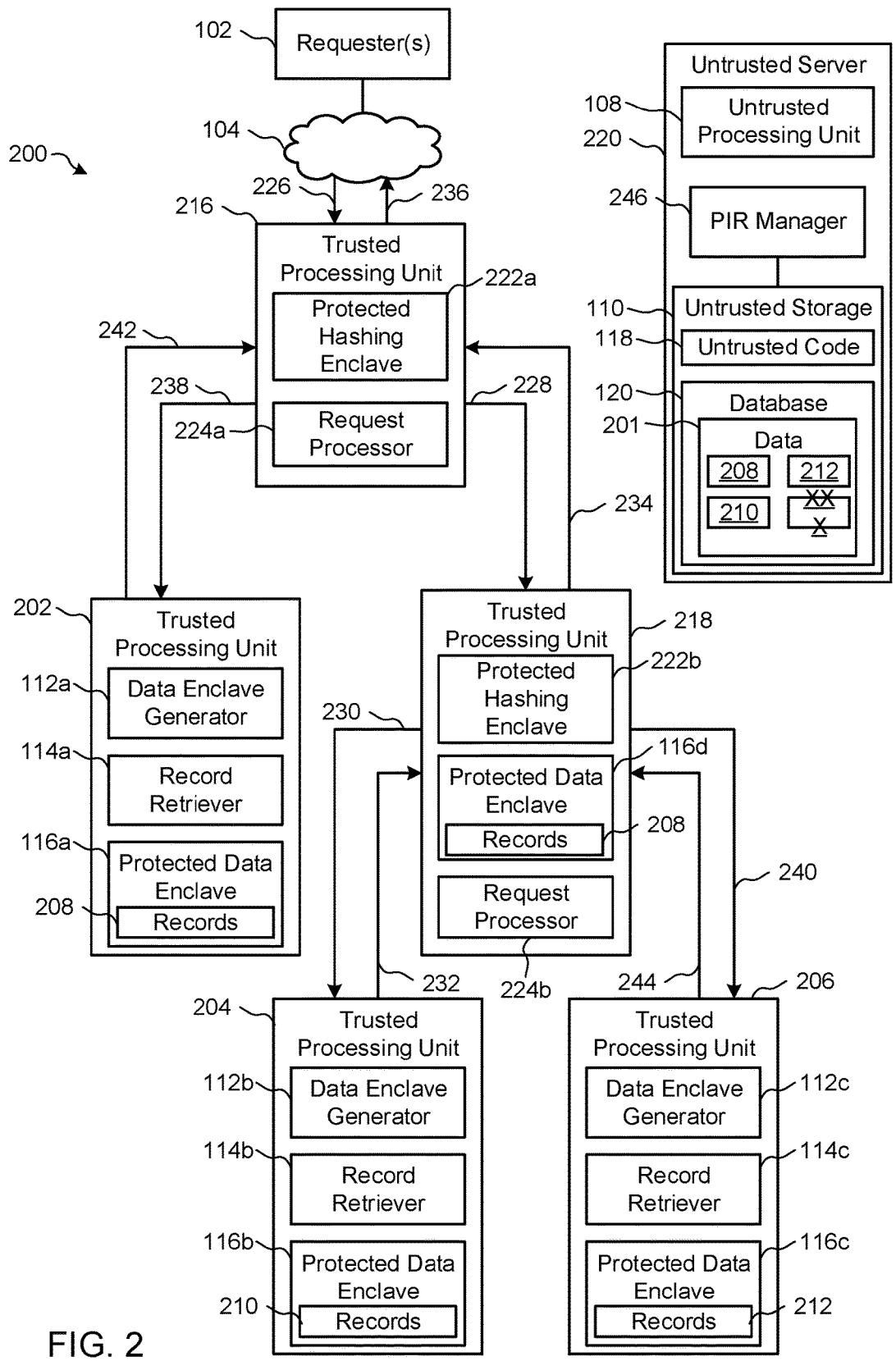
FIG. 2 is a block diagram of another example system constructed in accordance with the teachings of this disclosure to provide private information retrieval using multiple trusted processing units.

FIG. 2 is a block diagram of another example system 200 to provide private information retrieval using multiple trusted processing units. The example system 200 of FIG. 2 receives and responds to requests for data 201 in the example database 120 from one or more requester(s) 102. In the example of FIG. 2, the system 200 communicates with the requester(s) 102 via the communications network 104 of FIG. 1. In contrast with the example of FIG. 1, in the example of FIG. 2 trusted processing units are limited in an amount of data that can be protected, and the amount of data 201 stored in the database 120 is more than the threshold amount of data that is capable of protection by a single trusted processing unit. Thus, in the example of FIG. 2 the data in the database is split up between multiple trusted processing units 202-206 to protect an entirety of the data 201.

Each of the trusted processing units 202-206 in the example of FIG. 2 protects a respective portion of the data 201 in the database 120. In the example of FIG. 2, the data protected by the trusted processing units 202-206 constitutes all of the data 201. In some other examples, the data protected by the trusted processing units 202-206 constitutes portions of the data 201 for which private information retrieval is or may be desired by the requester(s) 102. As explained in more detail below, when a request for the data 201 is received, each of the example trusted processing units 202-206 receive either an actual request for one or more records protected by the trusted processing units 202-206 or a dummy request. As used herein, a "dummy request" is a request to which the response is not used to respond to a request for data (e.g., the response to the dummy request is not necessary). For example, a dummy request may be sent from the trusted processing unit 216 to the trusted processing unit 202 to obscure the fact that the trusted processing unit 216 is sending a request for data to the trusted processing unit 218. Dummy requests and actual requests are encrypted so that the untrusted processing unit 108 is unable to determine whether any given request is an actual request or a dummy request and, therefore, is unable to determine the trusted processing unit 202-206 from which a record is being requested.

By sending a request to each of the trusted processing units 202-206 from which a portion of the data can be accessed, whether a real request or a dummy request, accesses to the data 201 by the requester(s) 102 are obscured from untrusted entities. Rather, dummy requests are used in the system of FIG. 2 to obscure which of the processing units 202-206 is/are providing the record(s) to respond to a request.

In the example system 200 of FIG. 2, each of the trusted processing units 202-206 includes an instance of the data enclave generator 112*a*, 112*b*, 112*c*, an instance of the record retriever 114*a*, 114*b*, 114*c*, and generates an instances of the protected data enclave 116*a*, 116*b*, 116*c* of FIG. 1. The protected data enclave 116*a* in the trusted processing unit 202 stores a first subset of records 208 from the example data 201. Similarly, the protected data enclave 116*b* in the trusted processing unit 204 stores a second subset of records 210 from the example data 201, and the protected data enclave 116*c* in the trusted processing unit 204 stores a third subset of records 212 from the example data 201. The example data 201 also includes a fourth subset of records 214, which are discussed below. In combination, the records 208-214 stored in the protected data enclaves 116*a*-116*c* of FIG. 2 include all of the data 201 in the database 120.

The example system 200 of FIG. 2 further includes additional trusted processing units 216, 218 to provide access to the records 208-214 protected by the trusted processing units 202-206 while also obscuring from an untrusted server 220 any indications of which of the records 208-214 are being requested and/or accessed by requester(s) 102. As described in more detail below, the example trusted processing units 216, 218 help organize the trusted processing units 202-206 to efficiently and privately obtain records requested by the requester(s) 102. In the example of FIG. 2, the trusted processing units 202-206, 216, 218 are each separate physical devices.

The example trusted processing units 216, 218 of FIG. 2 each include a protected hashing enclave 222*a*, 222*b* and a request processor 224*a*, 224*b*. The example protected hashing enclaves 222 and the example request processors 224 are described below with reference to the trusted processing unit 216. However, the descriptions of the example protected hashing enclaves 222 and the example request processors 224 are also applicable to the trusted processing unit 218 of FIG. 2.

In some examples, the protected hashing enclaves 222*a*, 222*b* require relatively small amounts of data to be stored and protected by the trusted processing units 216, 218. In some such examples, the trusted processing units 216, 218 that implement protected hashing enclaves 222*a*, 222*b* may also implement protected data enclaves. For example, the trusted processing unit 218 of FIG. 2 also implements a protected data enclave 116*d* that can store records from the data 201 (e.g., the records 214).

The example trusted processing units 202-206, 216, 218 of FIG. 2 are implemented as separate processing devices that can communicate by exchanging requests and/or responses. For example, the trusted processing units 202-206, 216, 218 may be separate servers or other computing devices that are in communication with one or more others of the trusted processing units 202-206, 216, 218 via direct connections and/or via a network.

The example untrusted server 220 includes an untrusted processing unit (e.g., the untrusted processing unit 108 of FIG. 1) and an untrusted storage (e.g., the untrusted storage 110 of FIG. 1). The example untrusted storage 110 of FIG. 1 includes the example untrusted code 118 and the example untrusted database 120 of FIG. 1. The untrusted database 120 of FIG. 2 includes the data 201 to which the requester(s) 102 desire private access. The example system 200 of FIG. 2 provides private information retrieval (e.g., private access) to the data 201 in the database 120 of the untrusted server 220 via the trusted processing units 202-206, 216, 218 without the untrusted processing unit 108 or, more generally, the untrusted server 220 being able to determine or infer either the contents of the requests for the data 201 (e.g., requests for the records 208-214) or the accesses to the records 208-214 within the trusted processing units 202-206, 218.

As in the example of FIG. 1, the requester(s) 102 want to privately access data from the database 120, but do not trust the untrusted code 118. For example, the requester(s) 102 may be concerned that the untrusted code 118 may contain software that could attempt to profile them for marketing purposes or for more nefarious purposes. Therefore, the requester(s) 102 desire for the untrusted processing unit 108 to not have access to the contents of the request(s) or to be able to monitor the record(s) 208-214 that are accessed and/or provided to the requester(s) 102 in response to the request(s).

To provide private information retrieval, the example trusted processing units 202-206, 216, 218 are configured (e.g., logically arranged) in a tree structure as illustrated in FIG. 2. In the tree structure, the trusted processing units 202-206 that implement protected data enclaves 116 are configured as leaf nodes and the trusted processing units 216, 218 that implement protected hashing enclaves 222 are configured as branch nodes.

The trusted processing unit 216 receives a request 226 from a requester 102 for private information retrieval for one or more of the records 208-214 in the protected data enclaves 116. The example request 226 may be intended by the requester 102 as a request for the system 200 to provide access to the database 120 (e.g., via a request to a web server). Instead of being directed to the untrusted server 220 containing the original database 120, the request 226 is redirected to the trusted processing unit 216 to provide private information retrieval for the request 226.

The example protected hashing enclaves 222a, 222b of FIG. 2 calculate hashes of data requests (e.g., from information included in requests) to determine the one(s) of the trusted processing units 202-206 in which the requested record(s) 208-214 are stored and/or to determine the one(s) of the trusted processing units 202-206, 218 from which the requested record(s) 208-214 can be retrieved. The example protected hashing enclaves 222, like the protected data enclaves 116, are protected from access by entities other than the respective trusted processing unit 216, 218 in which the protected hashing enclaves 222 are implemented or executed. In the example of FIG. 2, each of the protected hashing enclaves 222a, 222b implements a different hash algorithm to determine one(s) of the trusted processing units 202-206, 2166 to which requests are to be sent in response to received requests. For example, the protected hashing enclave 222a implements a first hash algorithm that calculates whether a record 208-214 can be retrieved from the trusted processing unit 202 or the trusted processing unit 216, and the protected hashing enclave 222b implements a second hash algorithm that calculates whether a record 208-214 can be retrieved from the trusted processing unit 204 or the trusted processing unit 206.

In some other examples, the protected hashing enclaves 222a, 222b implement a same hash algorithm that calculates the one(s) of the trusted processing units 202-206 in which the requested record(s) can be found. Example hash algorithms that may be implemented by the protected hashing enclaves 222a, 222b implement a mapping scheme that maps the records 208, 210, 212, and 214 to the respective ones of the trusted processing units 202-206, 218.

The protected hashing enclave 222a uses a hash algorithm to sort the records 208-214 into two or more buckets, where each of the buckets corresponds to another of the trusted processing units 202-206, 218 from which the trusted processing unit 216 may request a record. For example, the protected hashing enclave 222a may sort the records 208-214 into two buckets corresponding to the trusted processing unit 202 (e.g., for the records 208) and the trusted processing unit 218 (e.g., for the records 210, 212, 214).

In some examples, the protected hashing enclave 222a sorts the records 208-214 into buckets corresponding to the trusted processing units 202-206 at the leaf nodes of the tree structure, and then combines buckets that are accessed via another trusted processing unit at a branch node of the tree structure (e.g., the trusted processing unit 218). For example, the protected hashing enclave 222a may generate different buckets for the trusted processing units 202-206 corresponding to the leaf nodes of the tree structure, apply the hash algorithm to the data 201 to determine the assignments of the records 208-214 to the respective ones of the buckets, and combine the buckets corresponding to the trusted processing units 204 and 206 that are accessed via the trusted processing unit 218.

When the example request processor 224a receives a request for record(s) (e.g., from a requester 102 and/or from another trusted processing unit 216, 218), the request processor 224a accesses the protected hashing enclave 222a to determine a location in the tree structure from which the requested record(s) are to be retrieved. The request processor 224a sends a request for the requested record(s) to the determined trusted processing units 202-206, 216, 218 at a next level in the tree structure. The request processor 224a also receives a response from the trusted processing units 202-206, 216, 218 in response to the request sent by the request processor 224a, where the received response includes a requested record. The request processor 224a then returns a response to the trusted processing unit 216, 218 or to the requester 102 from which the request was received.

In the example of FIG. 2, the request processor 224a receives the request 226. The request processor 224a processes the request 226 by applying the hash function (or algorithm) to the criteria in the request 226. For example, the request processor 224a applies the hash function used to sort the records 208-214 into the buckets in the protected hashing enclave 222a to determine the trusted processing unit 202-206 to which the requested record(s) correspond. Based on the hash function, the example request processor 224a determines that the requested records correspond to the trusted processing unit 218 (e.g., the requested records 210, 212 can be found in 204, 206). The example request processor 224a sends a request 228 for the requested record(s) to the trusted processing unit 218. The example request 228 is encrypted and specifies the desired record(s) needed to respond to the request 226.

The example request processor 224b receives the request 228 from the request processor 224a and determines the requested records by applying the hash algorithm to the request 228. The request processor 224b may apply a similar or identical process as the request processor 224a described above. For example, the request processor 224b accesses the protected hashing enclave 222b to determine that the requested record is in the records 210 corresponding to the trusted processing unit 204. Based on the determination, the request processor 224b sends a request 230 to the example trusted processing unit 204. In the example of FIG. 2, the request 230 is encrypted.

The example record retriever 114b receives the request 230 and accesses the record(s) 210 specified in the request 230. The example record retriever 114b then transmits a response 232 to the trusted processing unit 218 that transmitted the request 230. The example request processor 224b receives the response 232 including the accessed record(s) 210. The request processor 224*b* decrypts the response 232 and encrypts a response 234 to the request 228 that includes the accessed record(s) 210. The request processor 224*b* sends the response 234 to the trusted processing unit 216. The example request processor 224*a* receives the response 234 including the accessed record(s) 210. The request processor 224*a* decrypts the response 234 and encrypts a response 236 to the request 226 that includes the accessed record(s) 210. The request processor 224*a* sends the response 236 to the requester 102. The response 236 completes the private information retrieval process for the requester 102 by providing the requested record(s) 210 without enabling the untrusted server 220 to determine any information about the request 226, the accessed record(s) 210, or the response 236.

In addition to the requests 226, 228, 230 and the responses 232, 234, 236, the example trusted processing units 202-206, 216, 218 transmit dummy requests 238, 240 and corresponding dummy responses 242, 244 to obscure the actual requests 226-230 and the actual responses 232-236 (e.g., the requests and responses that access and return the requested data to the requester 102). For example, after the trusted processing unit 216 generates the request 228 to be transmitted to the trusted processing unit 218, the trusted processing unit 216 also generates the dummy request 238 to be transmitted to the trusted processing unit 202. Similarly, after the trusted processing unit 218 generates the request 230 to be transmitted to the trusted processing unit 204, the trusted processing unit 218 also generates the dummy request 240 to be transmitted to the trusted processing unit 206. The example dummy requests 238, 240 may include information indicating that the dummy requests 238, 240 may elicit the dummy responses 242, 244 with minimal processing resources being expended. In some other examples, the dummy requests 238, 240 may include a request for records, and the data contained in the responses 242, 244 is ignored or discarded in favor of using the information in the responses 232, 234 that contain the requested record(s).

In examples in which the record(s) 214 are requested, the example request processor 224*b* sends dummy requests to both of the trusted processing units 204, 206 to obscure the fact that the record 214 stored at the protected data enclave 216*d* is being requested. When the request processor 224*b* receives dummy responses from the trusted processing units 204, 206, the example request processor 224*b* may ignore both dummy responses and include the requested record(s) 214 in a response to the trusted processing unit 216.

In some examples, the requests 226-230, 238, 240 received by the trusted processing units 202-206, 216, 218 are identical in form, such that the same request format can be used by the record retrievers 114 and the request processors 224. Similarly, the example responses 232-236, 242, 244 transmitted by the trusted processing units 202-206, 216, 218 are identical in form, such that the same response format can be used by the record retrievers 114 and the request processors 224 to respond to requests. As mentioned above, dummy requests and/or dummy responses may include an indicator (e.g., a dummy bit) that indicates whether the request or response is intended to retrieve one or more records. By identifying dummy requests and/or dummy responses, the trusted processing unit(s) 202-206 may expend fewer processing cycles to generate a dummy response to the request because the record retrievers 114 need not query the protected data enclaves 116 when a dummy request is received.

The connections between the trusted processing units 202-206, 216, 218 are assumed to be accessible by the untrusted server 220. To obscure the content of requests and/or responses between the trusted processing units 202-206, 216, 218, the example requests 226-230, the dummy requests 238, 240, the responses 232-236, and/or the dummy responses 242, 244 are encrypted. Because the requests 226-230, 238, 240 and the responses 232-236, 242, 244 are encrypted during communication between the trusted processing units 202-206, 216, 218, the untrusted server 220 cannot determine which of the requests 226-230, 238, 240 are dummy requests or which of the responses 232-236, 242, 244 are dummy responses. Any entity monitoring the connections between the trusted processing units 202-206, 216, 218 would observe that a request from the requester 102 results in requests and responses being propagated through the entire tree structure (e.g., between each connected pair of the trusted processing units 202-206, 216, 218).

The example system 200 of FIG. 2 also includes a private information retrieval manager 246. The example private information retrieval manager 246 determines a size (e.g., in bytes) of the database 120 from which the data (e.g., records) may be requested. When the private information retrieval manager 246 determines that the size of the database 120 is equal to or less than a threshold size (e.g., equal to or less than a maximum amount of data that is protectable by one trusted processing unit), the private information retrieval manager 246 configures a single trusted processing unit to generate a protected data enclave to include the data 201. For example, the private information retrieval manager 246 may instantiate the system 100 of FIG. 1, where the single trusted processing unit 106 implementing the protected data enclave 116 may be implemented using a same computing device as the untrusted server 220 or using different computing devices.

On the other hand, when the private information retrieval manager 246 determines that the size of the database 120 is more than a threshold size (e.g., more than a maximum amount of data that is protectable by one trusted processing unit), the private information retrieval manager 246 configures multiple trusted processing units (e.g., the trusted processing units 202-206) to implement a number of the protected data enclaves 116 that is sufficient to protect the amount of data 201 (e.g., in bytes) that is present in the database 120. For example, if the amount of data 201 is more than twice the maximum amount of data that is protectable by one trusted processing unit, but less than three times the maximum amount of data that is protectable by one trusted processing unit, the private information retrieval manager 246 configures three trusted processing units 202-206, 218 to execute data enclave generators 112, record retrievers 114, and/or protected data enclaves 116 to protect different sets of records 208-214.

The example private information retrieval manager 246 also configures one or more trusted processing units 216, 218 to implement protected hashing enclaves 222 to organize the trusted processing units 202-206 that implement the protected data enclaves 116. For example, the private information retrieval manager 246 selects a number of protected hashing enclaves based on a number of desired levels in a tree structure and a number of protected data enclaves in the tree structure. To configure the example trusted processing units 216, 218, the private information retrieval manager 246 configures the trusted processing units 216, 218 to execute protected hashing enclaves 222 and request processors 224.

Figure 3:
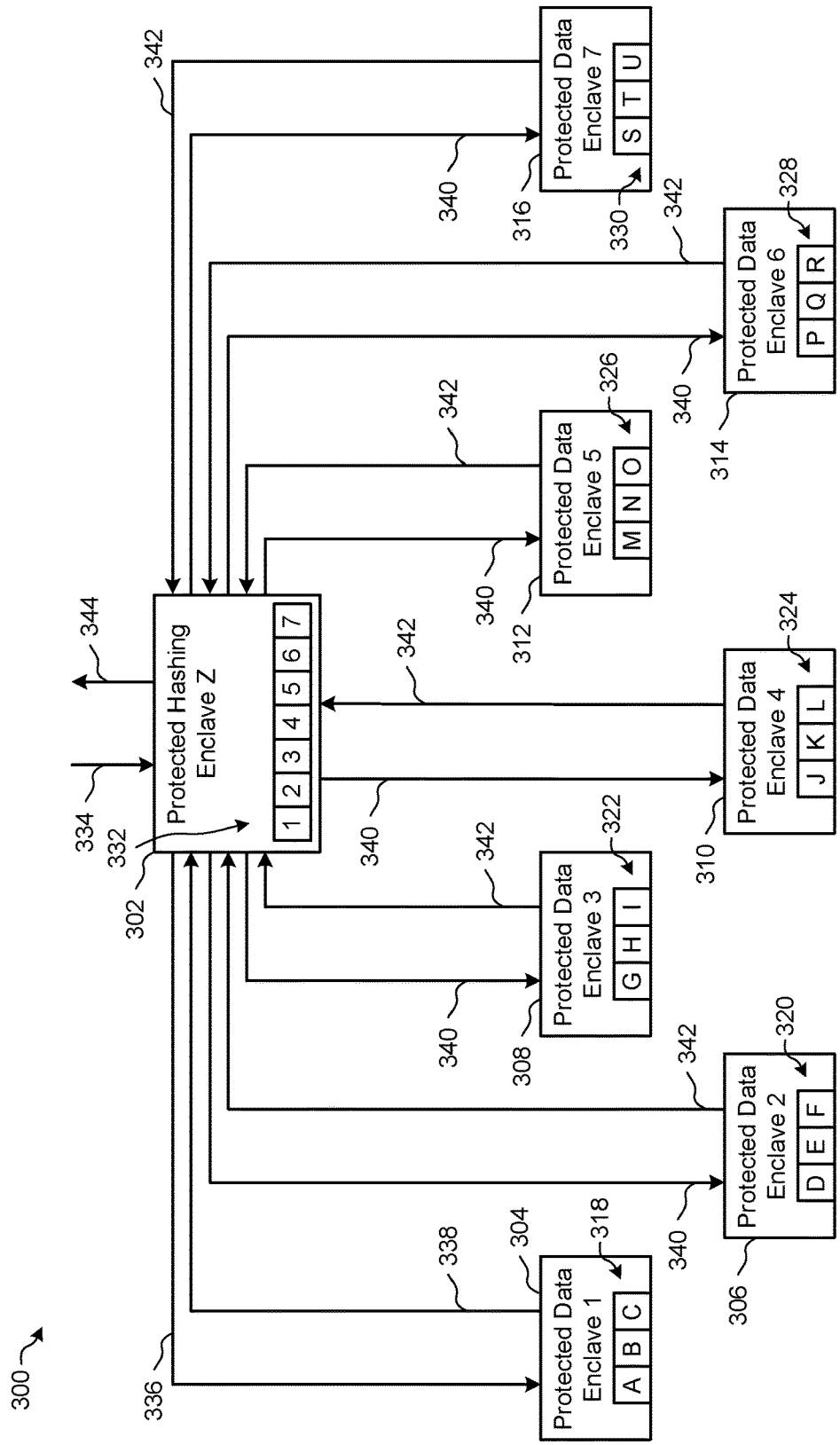
FIG. 3 illustrates an example of privately accessing a record in a database using protected hashing enclaves and protected data enclaves arranged in a tree structure.

FIG. 3 illustrates an example tree structure 300 including a protected hashing enclave 302 and protected data enclaves 304-316 to provide private information retrieval. In contrast to the example tree structure described above with reference to the system 200 of FIG. 2, the example tree structure 300 of FIG. 3 enables the protected hashing enclave 302 to refer to more than two protected data enclaves 304-316. For clarity, the example of FIG. 3 is described below with reference to the protected hashing enclave 302 and the protected data enclaves 304-316, and omits the discussion of trusted processing units. However, it should be understood that the example protected hashing enclave 302 and the protected data enclaves 304-316 of FIG. 3 are implemented using trusted processing units as described above with reference to FIGS. 1 and 2, such as the trusted processing units 106, 202-206, 216, 218 of FIGS. 1 and/or 2.

The example protected data enclaves 304-316 of FIG. 3 include respective subsets of records 318-330 which, in combination, constitute an entirety of the records in a database to which private information retrieval is provided by the tree structure 300. Example records in the subsets of records 318-330 are designated using letters A-U. The example protected hash enclave 302 stores a set of buckets 332 (e.g., buckets 1-7) that map records (or hash values) to the protected data enclaves 304-316 (e.g., protected data enclaves 1-7).

The example protected hashing enclave 302 of FIG. 3 receives a request 334 for the record B, which is stored in the protected data enclave 304. The example protected hashing enclave 302 decrypts the request 334 and processes the request by applying a hash function to the request 334 and/or performing a lookup using a lookup table. In some examples in which the records A-U are divided between the protected data enclaves 304-316 based on one or more contents of the records A-U, the protected hash enclave 302 parses a query contained in the request 334 to determine which of the protected data enclaves 304-316 is storing the record(s) A-U that correspond to the query.

In an example, the result of the hash function indicates that the protected data enclave 304 is storing the desired record B (e.g., the hash function yields a value corresponding to bucket 1). In some other examples, multiple ones of the protected data enclaves 304-316 may store one or more desired records. The example protected hashing enclave 302 sends a request 336 indicating the desired record B to the protected data enclave 304. In some examples, the protected hashing enclave 302 duplicates the request 334 (e.g., the content in the request 334) and sends the duplicate of the request 334 as the request 336 after identifying the protected data enclave 304 as the protected data enclave to which the request 336 should be directed. The protected hashing enclave 302 encrypts the request 336 prior to transmission.

The example protected hashing enclave 302 also generates and transmits dummy requests 340 to the example protected data enclaves 306-316 that do not include the desired record B. The example dummy requests 340 may include a dummy indicator (e.g., a dummy bit) and/or dummy data that indicates to the protected data enclaves 306-316 that the response to the dummy request 340 will not be used. In other examples, the protected hashing enclave 302 also generates the dummy requests 340 to request respective records D-U contained in the protected data enclaves 306-316. The dummy requests 340 are encrypted prior to transfer to the protected data enclaves 306-316.

The example protected data enclave 304 receives and decrypts the request 336, and determines that the record B is being requested. The example protected data enclave 304 obtains the record B and transmits a response 342 to the protected hashing enclave 302 that includes the record B. The protected data enclave 304 encrypts the response 338 prior to transmission.

The example protected data enclaves 306-316 receive and decrypt the dummy requests 340. In response to the dummy requests 340, each of the protected data enclaves 306-316 encrypts and transmits a corresponding dummy response 342. If the dummy requests 340 included dummy indicators (e.g., dummy bits), the example dummy responses 342 include dummy indicators (e.g., similar or identical to the dummy indicators in the dummy requests 340). Alternatively, if the dummy requests 340 were requests for records, the example dummy responses 342 include the requested records.

The example protected hashing enclave 302 receives the response 338 from the protected data enclave 304 and the dummy responses 342 from the protected data enclaves 306-316. The protected hashing enclave 302 decrypts the response 338 and the dummy responses 342, determines that the response 338 contains the requested record B, and determines that the dummy responses 342 do not contain any requested records. In examples in which the protected data enclave 304 sends actual requests as the dummy requests 340, the example protected hashing enclave 302 may maintain a table of the protected data enclaves 304-316 from which records are expected and/or from which dummy responses are expected. In some such examples, the protected hashing enclave 302 ignores or discards the received dummy responses 342 without decrypting the dummy responses 342, and without any untrusted entities (e.g., the untrusted processing unit 108 and/or the untrusted server 220 of FIGS. 1 and/or 2) being able to monitor the disposition of the dummy responses 342 by the protected hashing enclave 302.

The example protected hashing enclave 302 generates a response 344 to the request 334, where the response 344 includes the requested record B. The protected hashing enclave 302 encrypts and transmits the response 344 to provide the record B to the requester.

The example tree structure 300 of FIG. 3 requires that a trusted processing unit implementing the protected hashing enclave 302 transmits, receives, and processes more requests and responses than either of the trusted processing units 216, 218 of FIG. 2. As a result, the trusted processing unit implementing the protected hashing enclave 302 may require more computing resources to handle requests. However, the example two-level tree structure 300 saves bandwidth over a tree structure having 3 or more levels, such as the binary tree structure of FIG. 2, and the same number of protected data enclaves (e.g., seven protected data enclaves) because there are fewer or no requests or responses being transmitted between protected hashing enclaves. The example tree structure 300 also requires fewer trusted processing units than a binary tree structure having the same number of protected data enclaves.

While an example manner of implementing the disclosed systems 100, 200 are illustrated in FIGS. 1, 2, and 3, one or more of the elements, processes and/or devices illustrated in FIGS. 1, 2, and 3 may be combined, divided, re-arranged, omitted, eliminated and/or implemented in any other way. Further, the example trusted processing units 106, 202-206, 216, 218, the example data enclave generators 112, the example record retrievers 114, the example protected data enclaves 116, 304-316, the example protected hashing enclaves 222, 302, the example request processors 224, the example private information retrieval manager 246 and/or, more generally, the example systems 100, 200 of FIGS. 1 and/or 2 may be implemented by hardware, software, firmware and/or any combination of hardware, software and/or firmware. Thus, for example, any of the example trusted processing units 106, 202-206, 216, 218, the example data enclave generators 112, the example record retrievers 114, the example protected data enclaves 116, 304-316, the example protected hashing enclaves 222, 302, the example request processors 224, the example private information retrieval manager 246 and/or, more generally, the example systems 100, 200 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example trusted processing units 106, 202-206, 216, 218, the example data enclave generators 112, the example record retrievers 114, the example protected data enclaves 116, 304-316, the example protected hashing enclaves 222, 302, the example request processors 224, and/or the example private information retrieval manager 246 is/are hereby expressly defined to include a tangible computer readable storage device or storage disk such as a memory, a digital versatile disk (DVD), a compact disk (CD), a Blu-ray disk, etc. storing the software and/or firmware. Further still, the example systems 100, 200 of FIGS. 1 and/or 2 may include one or more elements, processes and/or devices in addition to, or instead of, those illustrated in FIGS. 1 and/or 2, and/or may include more than one of any or all of the illustrated elements, processes and devices.

Flowcharts representative of example machine readable instructions for implementing the example systems 100, 200 of FIGS. 1 and/or 2 are shown in FIGS. 4, 5, 6, and 7. In this example, the machine readable instructions comprise program(s) for execution by a processor such as the processors 812, 912, 1012 shown in the example processor platforms 800, 900, 1000 discussed below in connection with FIGS. 8, 9, and 10. The program(s) may be embodied in software stored on a tangible computer readable storage medium such as a CD-ROM, a floppy disk, a hard drive, a digital versatile disk (DVD), a Blu-ray disk, or a memory associated with the processors 812, 912, 1012, but the entire program(s) and/or parts thereof could alternatively be executed by a device other than the processors 812, 912, 1012 and/or embodied in firmware or dedicated hardware. Further, although the example program(s) are described with reference to the flowcharts illustrated in FIGS. 4, 5, 6, and 7 many other methods of implementing the example systems 100, 200 of FIGS. 1 and/or 2 may alternatively be used. For example, the order of execution of the blocks may be changed, and/or some of the blocks described may be changed, eliminated, or combined.

As mentioned above, the example processes of FIGS. 4, 5, 6, and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 4, 5, 6, and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 4:
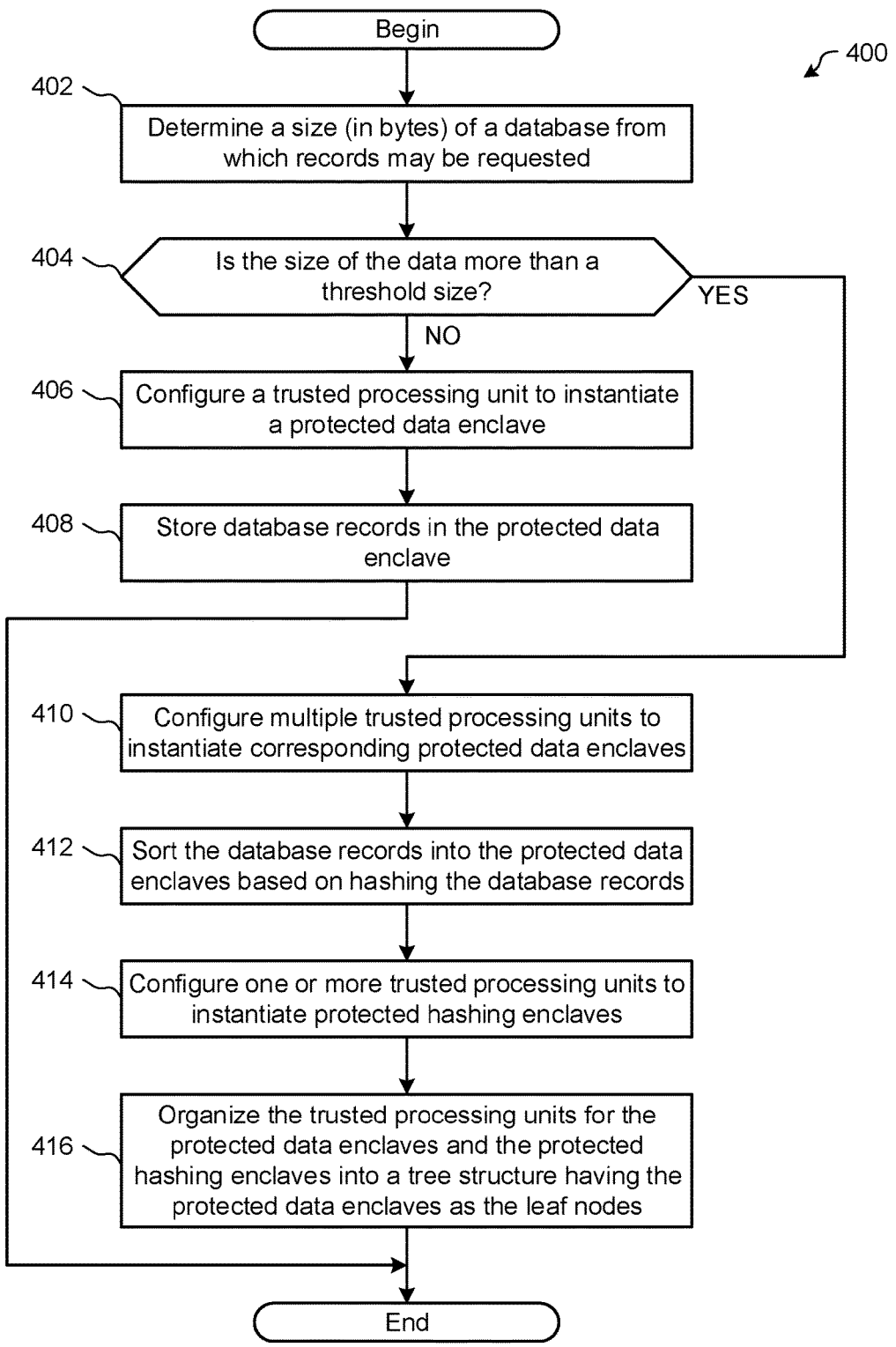
FIG. 4 is a flowchart representative of example machine readable instructions which may be executed to implement the example systems of FIGS. 1 and/or 2 to generate one or more protected data enclaves to provide private information retrieval from a database.

FIG. 4 is a flowchart representative of example machine readable instructions 400 which may be executed to implement the examples of FIGS. 1 and/or 2 to generate one or more protected data enclaves 116 to provide private information retrieval from a database 120. The example instructions 400 of FIG. 4 may be implemented by the example private information retrieval manager 246 in the system 200 of FIG. 2, and the example instructions 400 enable private information retrieval to be provided using one or more trusted processing units. The example instructions 400 will be described below with reference to the system 200 of FIG. 2.

The example private information retrieval manager 246 determines a size (e.g., in bytes) of a database from which records may be requested (block 402). For example, the private information retrieval manager 246 may query the untrusted server 220 to request a data size of the data 201 in the database 120. The private information retrieval manager 246 determines whether the size of the data 201 is more than a threshold size (block 404). For example, the private information retrieval manager 246 may compare the size of the data 201 to a maximum amount of data that is protectable by a trusted processing unit.

If the size of the data 201 is not more than the threshold size (block 404), the example private information retrieval manager 246 configures a trusted processing unit to instantiate a protected data enclave (e.g., the protected data enclave 116 of FIG. 1) (block 406). For example, when the amount of data 201 is less than or equal to the maximum amount that is protectable by a trusted processing unit, the example private information retrieval manager 246 configures the trusted processing unit 106 of FIG. 1 to implement the data enclave generator 112, the record retriever 114, and the protected data enclave 116. The example data enclave generator 112 stores database records (e.g., the data 201) in the protected data enclave 116 (block 408). When the data 201 is stored (e.g., copied) in the protected data enclave 116, only the trusted processing unit 106 is able to access the stored data (e.g., records) in the protected data enclave 116 or have knowledge of the portions of the data in the protected data enclave 116 (e.g., records) that are accessed.

When the size of the data 201 is more than the threshold size (block 404), the example private information retrieval manager 246 configures multiple trusted processing units to instantiate corresponding protected data enclaves (block 410). For example, the private information retrieval manager 246 configures each of the trusted processing units 202-206 of FIG. 2 to implement a corresponding data enclave generator 112, a corresponding record retriever 114, and a corresponding protected data enclave 116 when the amount of data 201 is more than the maximum amount that is protectable by a trusted processing unit.

The example data enclave generators 112a-112c sort the database records 208-214 into the protected data enclaves 116a-116d based on hashing the database records (block 412). For example, the private information retrieval manager 246 may specify hash value(s) for the data enclave generator 112a which, when record(s) 208 in the database 120 match the hash value(s), cause the data enclave generators 112a to include the record(s) 208 in the respective protected data enclaves 116a.

The example private information retrieval manager 246 also configures one or more trusted processing units 216, 218 to instantiate protected hashing enclaves 222 (block 414). For example, the private information retrieval manager 246 determine a number of protected hashing enclaves 222 to be used based on the number of protected data enclaves 116 that have been instantiated and based on a number of levels desired in the tree structure. In the example of FIG. 2, the private information retrieval manager 246 configures the trusted processing units 216, 218 to implement a corresponding protected hashing enclave 222 and a corresponding request processor 224. As part of the configuration, the protected hashing enclaves 222a-222b are generated to implement respective hash function(s) and/or hash value(s) used to instantiate the protected data enclaves 116 of FIG. 2.

The example private information retrieval manager 246 organizes the trusted processing units 202-206, 216, 218 for the protected data enclaves 116 and the protected hashing enclaves 222 into a tree structure having the protected data enclaves 116 as the leaf nodes of the tree structure (block 416). For example, the private information retrieval manager 246 may configure the request processors 224 of FIG. 2 to transmit requests to designated trusted processing units. In some examples, the private information retrieval manager 246 organizes the trusted processing units 202-206, 216, 218 in the tree structure by providing configuration information to the protected hashing enclaves 222, such as hash algorithm information. For example, the protected hashing enclave 222a may store buckets that indicate that a requested record can be retrieved by a request to the trusted processing unit 202 or a request to the trusted processing unit 218.

After organizing the trusted processing units (block 416), or after storing the database records in one protected data enclave (block 408), the example instructions 400 of FIG. 4 end.

Figure 5:
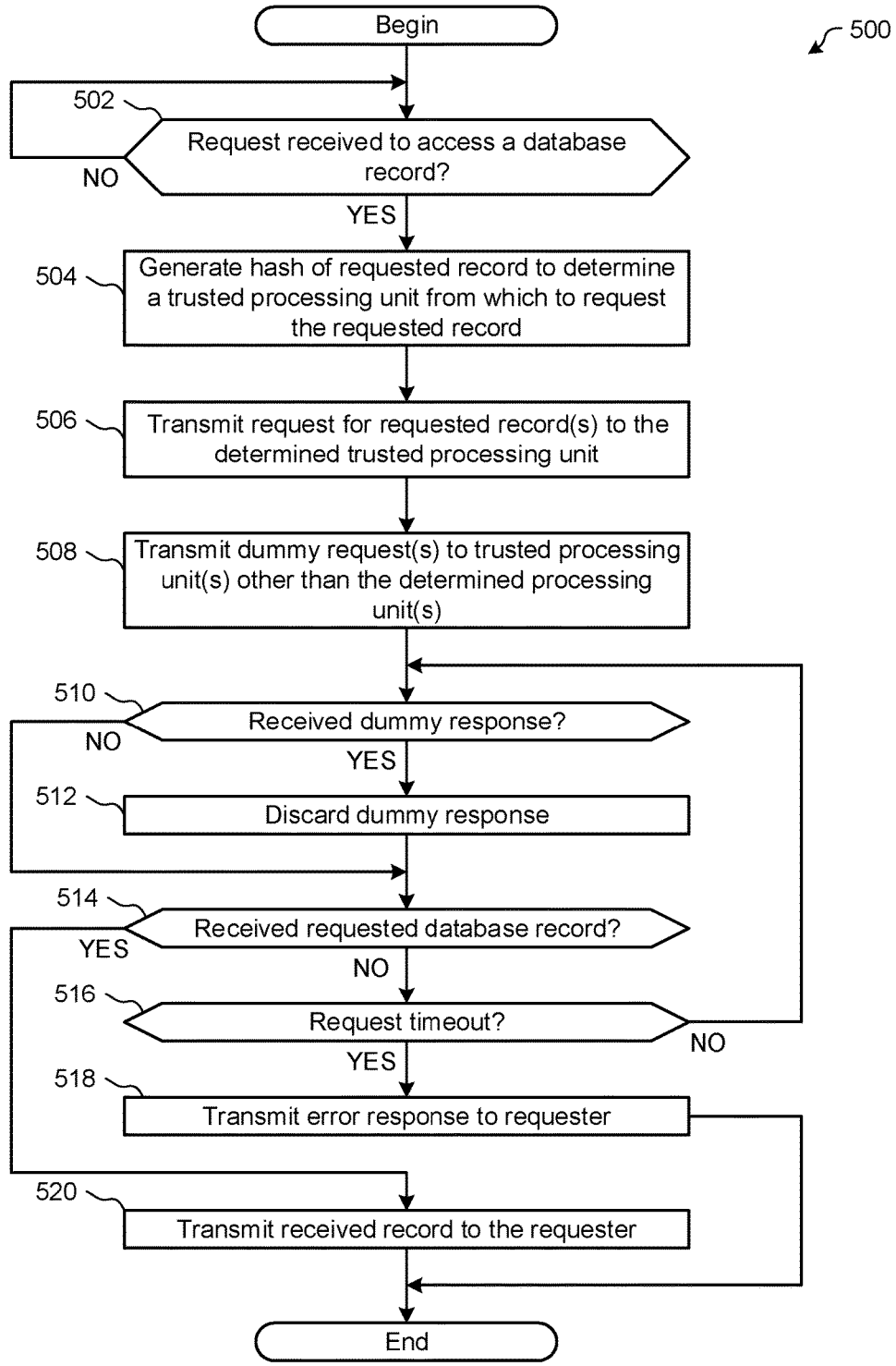
FIG. 5 is a flowchart representative of example machine readable instructions which may be executed to implement the example systems of FIGS. 1 and/or 2 to service a request for private information retrieval from a database.

FIG. 5 is a flowchart representative of example machine readable instructions 500 which may be executed to implement the example systems 100, 200 of FIGS. 1 and/or 2 to service a request for private information retrieval from a database. The example instructions 500 are described below with reference to the example trusted processing unit 216 of FIG. 2.

The example request processor 224a of FIG. 2 determines whether a request has been received to access a database record (block 502). For example, the request processor 224a may receive the request 226 from the requester 102 that specifies one or more of the records 208-214 from the database 120. If a request has not been received to access a database record (block 502), the request processor 224a iterates block 502 to await a request.

When the request 226 is received (block 502), the example request processor 224a generates a hash of the requested record to determine a trusted processing unit from which to request the requested record (block 504). For example, the hash of the requested record may yield a value that matches one of multiple buckets in the protected hashing enclave 222a, where the buckets correspond to the trusted processing units 202 and 218. The request processor 224a transmits a request (e.g., the request 228 of FIG. 2) for the requested record to the determined trusted processing unit 218 (block 506). In some examples, the transmitted request 228 includes content that is similar or identical to the received request 226. In some examples, transmitting the request further includes encrypting the request 228 prior to transmission.

The example request processor 224a also transmits one or more dummy request(s) to trusted processing unit(s) other than the determined trusted processing unit 218 (block 508). For example, when the request 228 is sent to the trusted processing unit 218, the example request processor 224a also generates and transmits the dummy request 238 to the trusted processing unit 202.

The request processor 224a determines whether a dummy response has been received (block 510). For example, the request processor 224a may determine whether a response 242 has been received that is marked as a dummy response and/or whether a response has been received from a trusted processing unit to which a dummy request was sent. If a dummy response 242 has been received (block 510), the example request processor 224a discards the dummy response 242.

After discarding the dummy response 242 (block 512), or if a dummy response has not been received (block 510), the example request processor 224a determines whether the requested database record has been received (e.g., from the trusted processing unit 218) (block 514). If the requested database record has not been received (block 514), the example request processor 224a determines whether the request has timed out (block 516). If the request has not timed out (block 516), control returns to block 508 to continue waiting for the requested database record. If the request has timed out (block 516), the example request processor 224a returns an error response to the requester (block 518). For example, if a response to the request 228 has not been received by the request processor 224a within a permissible time, the request processor 224a notifies the requester 102 that the request 226 resulted in an error.

When a requested database record has been received (e.g., in the response 234 from the trusted processing unit 218) (block 514), the example request processor 224a transmits the received record to the requester 102 (block 520). For example, the request processor 224a transmit the received record to the requester 102 as a response 236 to the request 226. The example request processor 224a encrypts the response 236 of FIG. 2 prior to transmission.

Figure 6:
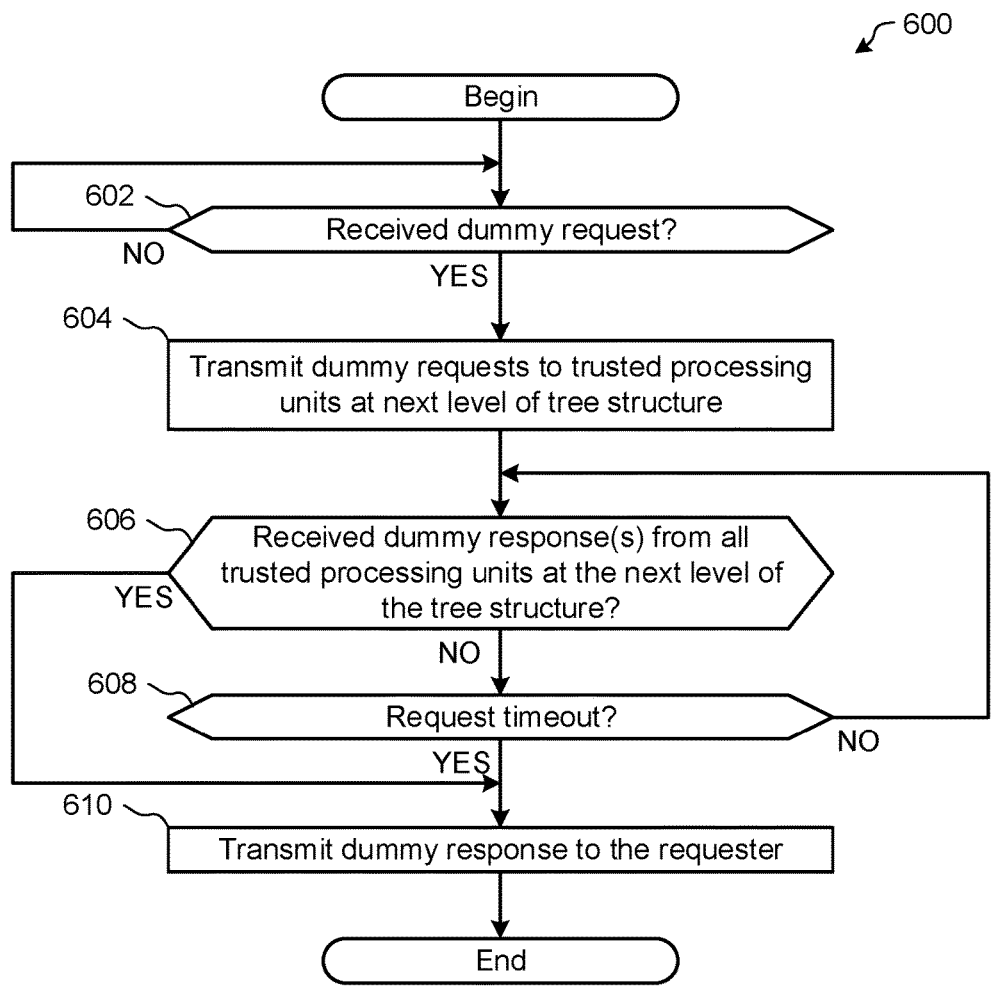
FIG. 6 is a flowchart representative of example machine readable instructions which may be executed to implement the example systems of FIGS. 1 and/or 2 to receive and process dummy requests.

FIG. 6 is a flowchart representative of example machine readable instructions 600 which may be executed to implement the example systems 200 of FIGS. 1 and/or 2 to receive and process dummy requests. The example instructions 600 of FIG. 6 will be described below with reference to the request processor 224b of FIG. 2. However, the example instructions 600 may be implemented by any request processor 224 that is not at a top level of a tree structure (e.g., the instructions 600 would not be implemented by the example request processor 224a of FIG. 2).

The example request processor 224b determines whether a dummy request has been received (block 602). As discussed above, a dummy request is a request intended to obscure requests for data and/or to prevent deduction of the identities and/or patterns of data accesses. If a dummy request has not been received (block 602), the example request processor 224b iterates block 602 to await a dummy request (which may be executed simultaneously or alternating with block 502 of FIG. 5).

When a dummy request is received (block 602), the example request processor 224b transmits dummy requests to trusted processing units at the next level of the tree structure (block 604). Because a dummy request received at the request processor 224b is not a request for data that will be provided to a requester, the example request processor 224b transmits dummy requests to all of the trusted processing units at the next lower level (e.g., the next level closer to the leaf nodes) of the tree structure. In the example of FIG. 2, when the request processor 224b receives a dummy request, the request processor 224b generates and transmits dummy requests to the trusted processing units 204 and 206.

The example request processor 224b determines whether dummy responses from all of the trusted processing units at the next level of the tree structure have been received (block 606). For example, the example request processor 224b may determine whether all of the trusted processing units 204, 206 to which dummy requests were transmitted have returned a dummy response. If fewer than all of the trusted processing units at the next level of the tree structure have been received (block 606), the example request processor 224b determines whether a dummy request timeout has occurred (block 608). If the request has not timed out (block 608), control returns to block 606 to continue waiting for dummy responses from the trusted processing units 204, 206.

If the request has timed out (block 608), or when dummy responses have been received from all of the trusted processing units 204, 206 at the next level of the tree structure (block 606), the example request processor 224b transmits a dummy response to the requester (block 610). In the example system 200 of FIG. 2, the request processor 224b sends a dummy response to the trusted processing unit 216 from which the dummy request was received. The example instructions 600 of FIG. 6 then end.

Figure 7:
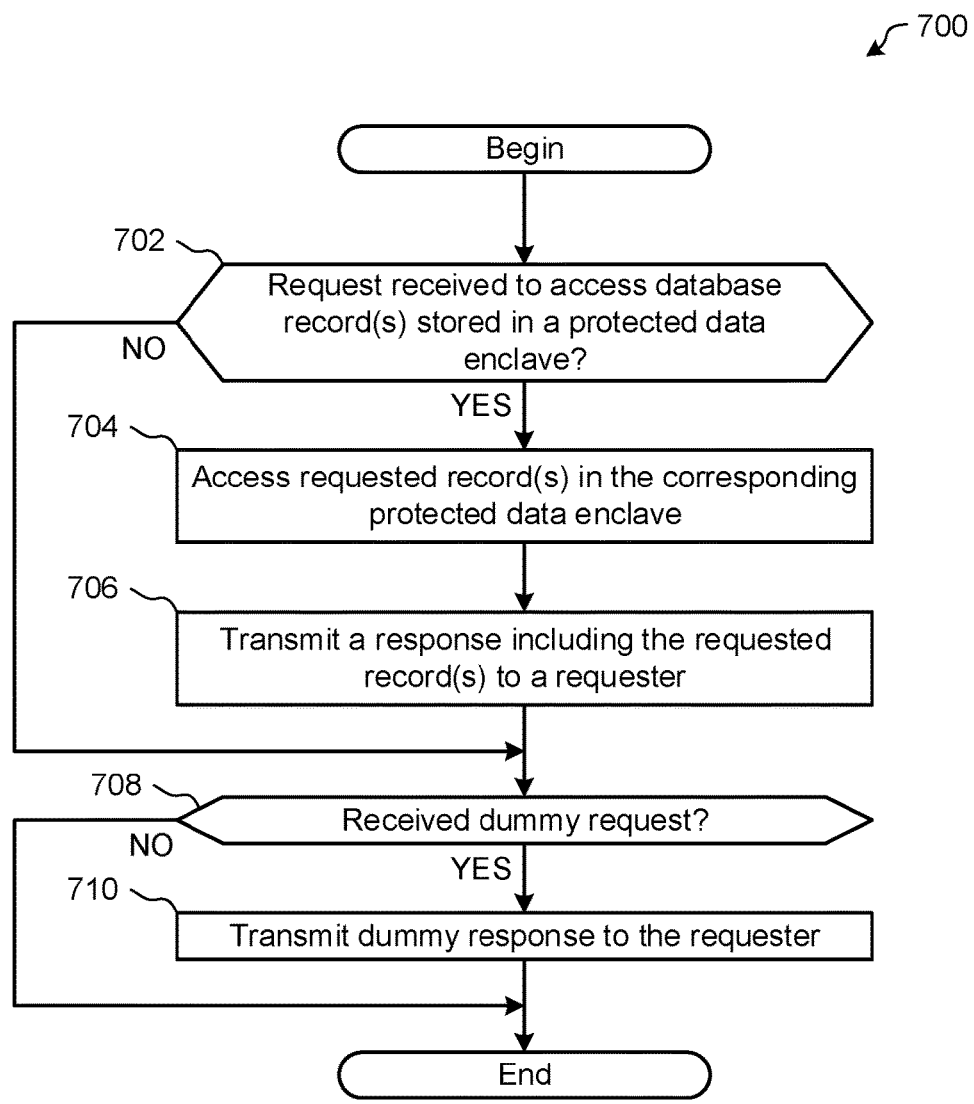
FIG. 7 is a flowchart representative of example machine readable instructions which may be executed to implement the example systems of FIGS. 1 and/or 2 to receive and respond to requests.

FIG. 7 is a flowchart representative of example machine readable instructions 700 which may be executed to implement the example systems 100, 200 of FIGS. 1 and/or 2 to receive and respond to requests. The example instructions 700 of FIG. 7 will be described below with reference to the record retriever 114a of FIG. 2. However, the example instructions 700 may be implemented by any of the record retrievers 114 of FIGS. 1 and/or 2.

The example record retriever 114a of FIG. 2 determines whether a request has been received to access a database record (block 702). For example, the record retriever 114a may receive a request 226 from the trusted processing unit 216 and/or from a requester 102 that specifies one or more of the records 208 from the database 120 that is stored in the corresponding protected data enclave 116a. If a request to access a record has been received (block 702), the example record retriever 114a accesses the requested record(s) 208 from the protected data enclave 116a (block 704). The record retriever 114a transmits a response including the requested record(s) 208 to a requester (e.g., an entity from which the request for the record(s) 208 was received) (block 706).

After transmitting the response (block 706), or if a request to access database records has not been received (block 702), the example record retriever 114a determines whether a dummy request has been received (block 708). If a dummy request has been received (block 708), the example record retriever 114a transmits a dummy response to the requester (block 710). For example, the record retriever 114a may transmit a response that has a dummy indicator in response to receiving a dummy request that has a dummy indicator. In the example of FIG. 2, responses sent in block 706 and/or responses sent in block 710 are sent from the record retriever 114a to the trusted processing unit 216.

After transmitting the dummy response (block 710), or if a dummy request has not been received (block 708), the example instructions 700 of FIG. 7 end.

Figure 8:
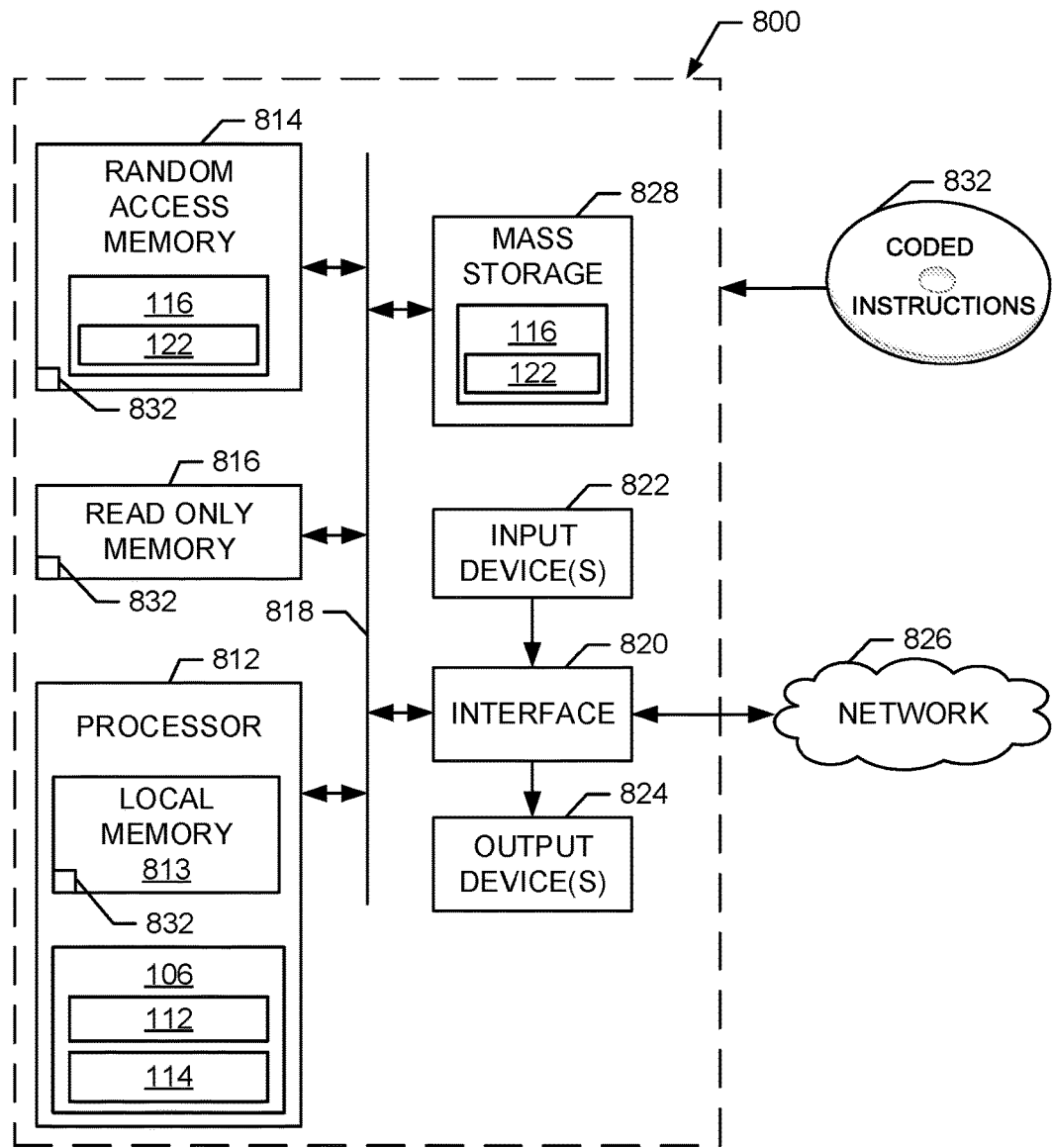
FIG. 8 is a block diagram of an example processor platform capable of executing the instructions of FIGS. 4 and/or 7 to implement the trusted processing unit, the example data enclave generator, the example record retriever, and/or the example protected data enclave of FIGS. 1 and/or 2.

FIG. 8 is a block diagram of an example processor platform 800 capable of executing the instructions of FIGS. 4 and/or 7 to implement the trusted processing unit 106, the example data enclave generator 112, the example record retriever 114, and/or the example protected data enclave 116 of FIGS. 1 and/or 2. The processor platform 800 can be, for example, a server, a personal computer, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The example processor 812 of FIG. 8 may implement the trusted processing unit 106, the example data enclave generator 112, and/or the example record retriever 114 of FIGS. 1 and/or 2. For example, the processor 812 may execute software guard extensions (SGX) or another trusted execution environment implementation to securely implement the trusted processing unit 106, the example data enclave generator 112, and/or the example record retriever 114.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives. The example volatile memory 814 and/or the example mass storage devices 828 of FIG. 8 may implement the protected data enclave 116, the protected data 124, and/or the data 122, 201 of FIGS. 1 and/or 2.

The coded instructions 832 of FIGS. 4 and/or 7 may be stored in the mass storage device 828, in the volatile memory 814, in the non-volatile memory 816, and/or on a removable tangible computer readable storage medium such as a CD or DVD.

Figure 9:
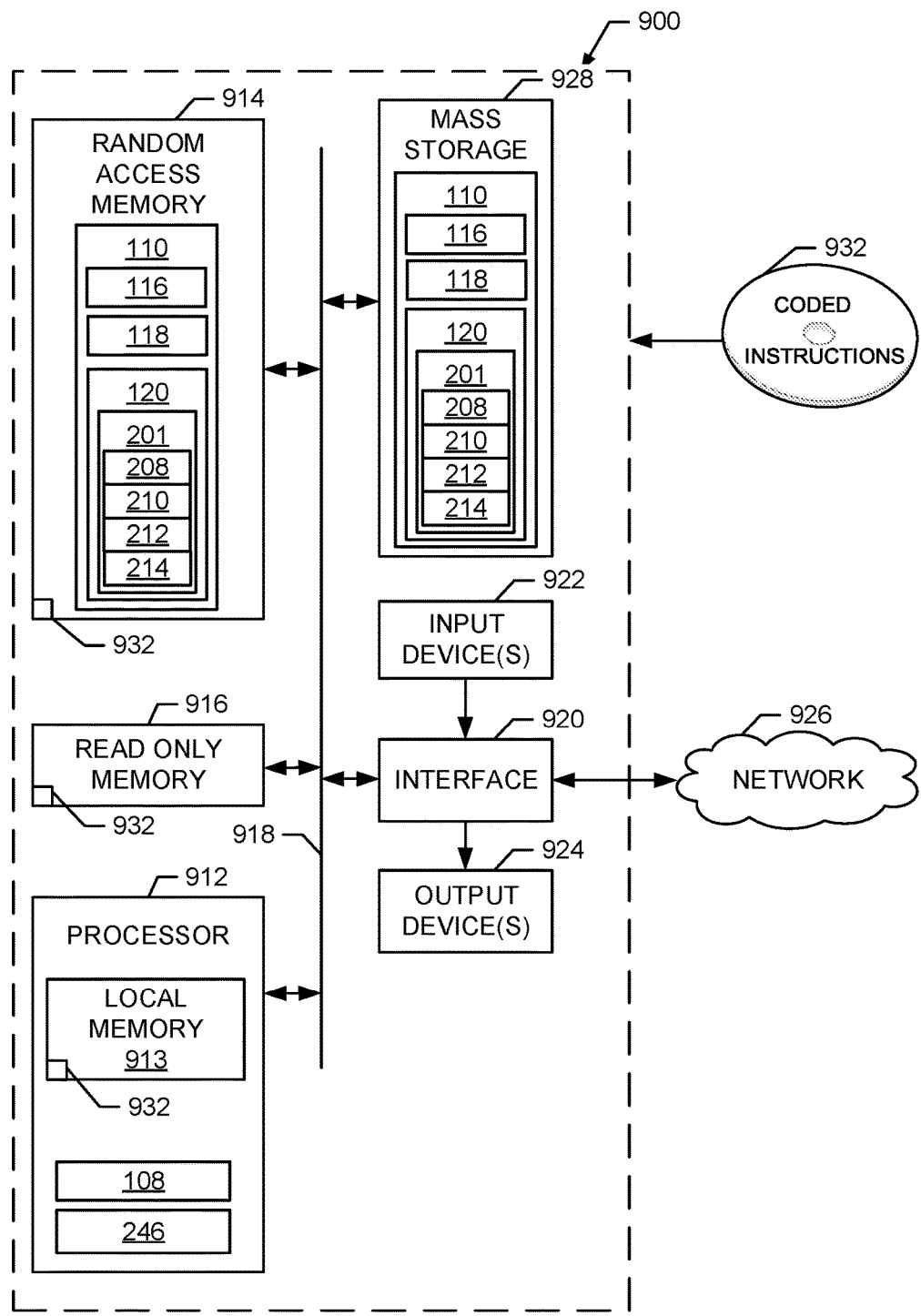
FIG. 9 is a block diagram of an example processor platform capable of executing the instructions of FIG. 4 to implement the untrusted processing unit, untrusted storage, the untrusted code, the database, the data, the records and/or the example private information retrieval manager of FIGS. 1 and/or 2.

FIG. 9 is a block diagram of an example processor platform 900 capable of executing the instructions of FIG. 4 to implement the untrusted processing unit 108, untrusted storage 110, the untrusted code 118, the database 120, the data 122, 201 the records 208-214 and/or the example private information retrieval manager 246 of FIGS. 1 and/or 2. The processor platform 900 can be, for example, a server, a personal computer, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The example processor 912 of FIG. 9 may implement the untrusted processing unit 108 and/or the private information retrieval manager 246 of FIGS. 1 and/or 2.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives. The example volatile memory 914 and/or the example mass storage devices 928 of FIG. 9 may implement the untrusted storage 110, the protected data enclaves 116, the untrusted code 118, the database 120, the data 122, 201 and/or the records 208-214 of FIGS. 1 and/or 2.

The coded instructions 932 of FIG. 4 may be stored in the mass storage device 928, in the volatile memory 914, in the non-volatile memory 916, and/or on a removable tangible computer readable storage medium such as a CD or DVD.

Figure 10:
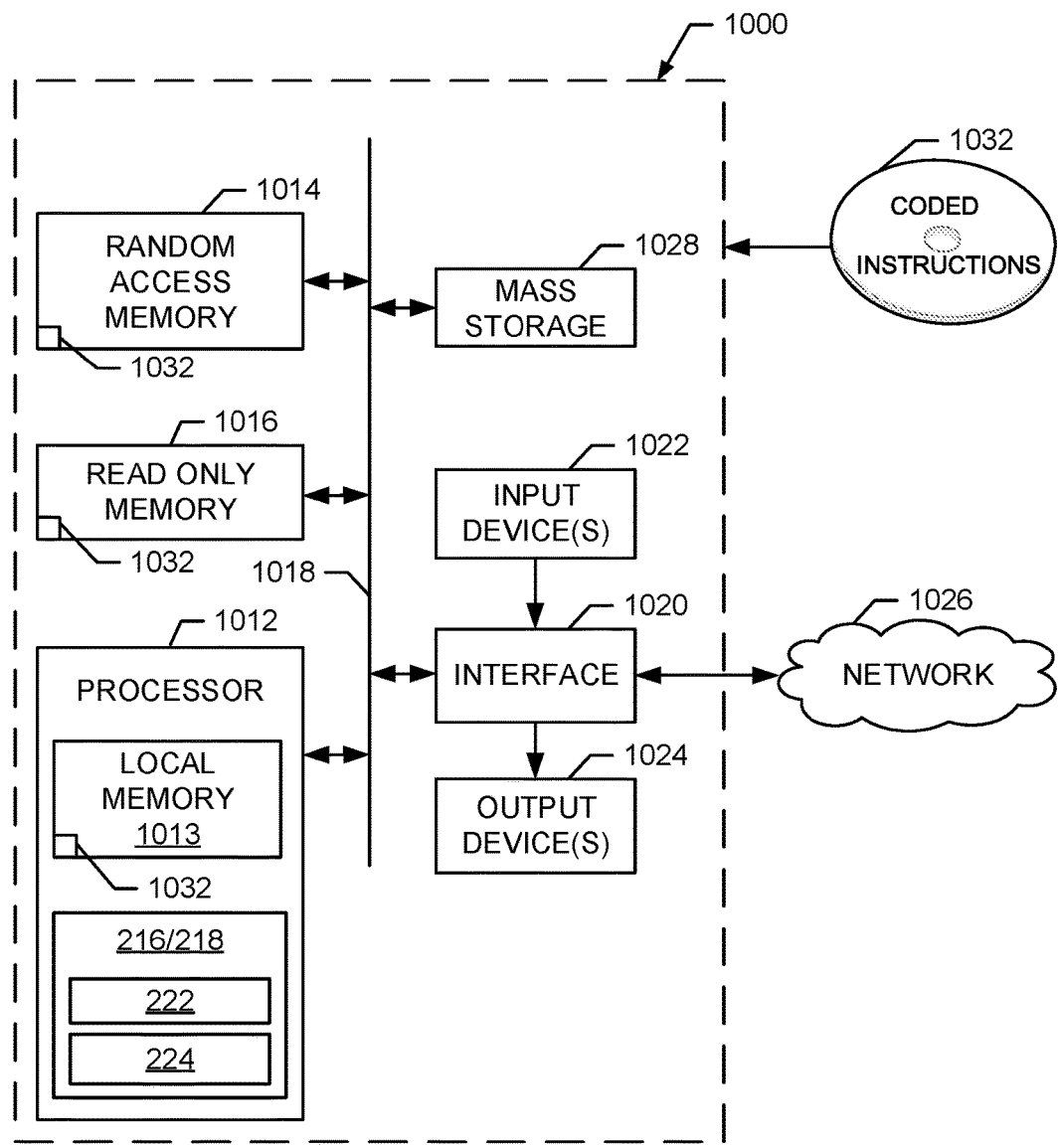
FIG. 10 is a block diagram of an example processor platform capable of executing the instructions of FIGS. 4, 5, 6, and/or 7 to implement the trusted processing units, the example hashing enclave generators, the example protected hashing enclave, the example request processors of FIG. 2.

FIG. 10 is a block diagram of an example processor platform 1000 capable of executing the instructions of FIGS. 4, 5, 6, and/or 7 to implement the trusted processing units 216, 218, the example protected hashing enclave 222, the example request processors 224 of FIG. 2. The processor platform 1000 can be, for example, a server, a personal computer, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The example processor 1000 of FIG. 10 may implement the trusted processing units 216, 218, the example protected hashing enclaves 222, and/or the example request processors 224.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 4, 5, 6, and/or 7 may be stored in the mass storage device 1028, in the volatile memory 1014, in the non-volatile memory 1016, and/or on a removable tangible computer readable storage medium such as a CD or DVD.

Example 1 is a system which includes a first trusted processing unit to store a first portion of data such that entities other than the first trusted processing unit are unable to access the first portion of the data in the first trusted processing unit; a second trusted processing unit to store a second portion of the data such that entities other than the second trusted processing unit are unable to access the second portion of the data in the second trusted processing unit; and a third trusted processing unit to determine that a data element specified in a request is stored in the first trusted processing unit, request the data element from the first trusted processing unit, send a dummy request to the second trusted processing unit, and send the data element to a requester.

Example 2 includes the subject matter of example 1, in which the second trusted processing unit sends a dummy response to the third trusted processing unit in response to the dummy request.

Example 3 includes the subject matter of example 2, in which the dummy request includes a first dummy indicator and the dummy response includes a second dummy indicator.

Example 4 includes the subject matter of example 2, in which the dummy request specifies a second data element stored in the second trusted processing unit, and the third trusted processing unit discards the dummy response.

Example 5 includes the subject matter of example 1, in which the third trusted processing unit requests the data element from the first trusted processing unit such that only the first trusted processing unit and the third trusted processing unit can identify the data element that is requested from the first trusted processing unit.

Example 6 includes the subject matter of example 1, in which the first trusted processing unit includes a data enclave generator to create a protected data enclave in a first portion of a first storage device, the first storage device being protected by the first trusted processing unit, and store the first portion of the data in the protected data enclave.

Example 7 includes the subject matter of example 6, in which the data enclave generator identifies data elements belonging to the first portion of the data to be stored in the protected data enclave by applying a function to the data elements and comparing a) values that result from the applying of the function to b) a first value that corresponds to the first trusted processing unit and that is different than a second value that corresponds to the second trusted processing unit.

Example 8. A system as defined in example 1, wherein the third trusted processing unit includes a protected hashing enclave to sort data elements of the data into a first data bucket or a second data bucket, the first data bucket corresponding to the first trusted processing unit and the second data bucket corresponding to the second trusted processing unit.

Example 9. A system as defined in example 8, wherein the third trusted processing unit further includes a request processor to request the data element specified in the request from the first trusted processing unit based on the protected hashing enclave performing a hash function on the data element specified in the request and determining whether a result of the hash function corresponds to the first bucket or the second bucket.

Example 10. A system as defined in example 1, further including a fourth trusted processing unit to: determine that the data element specified in the request is accessible via the third trusted processing unit and is not accessible via a fifth trusted processing unit; and request the data element from the third trusted processing unit such that only the fourth trusted processing unit and the third trusted processing unit can identify the data element that is requested from the third trusted processing unit, the fourth trusted processing unit being the requester to the third trusted processing unit.

Example 11 is a method that includes using trusted processing units, generating protected data enclaves to store a copy of data in a database, each of the protected data enclaves being accessible to only corresponding ones of the trusted processing units that generated the protected data enclaves; in response to receiving a first request for a record in the data at a first one of the trusted processing units, determining, using the trusted processing units, which one of the protected data enclaves contains the record; sending second requests between the trusted processing units to retrieve the record from the determined one of the protected data enclaves; sending dummy requests to the ones of the trusted processing units that correspond to ones of the protected data enclaves that do not contain the record; and sending the record to a requester.

Example 12 includes the subject matter of example 11, in which the data is split between the protected data enclaves.

Example 13 includes the subject matter of example 11, in which the database is stored on a computing device having a processor, and the generating of the protected data enclaves includes generating the protected data enclaves to prevent access by the processor to portions of memory in which the protected data enclaves are stored.

Example 14 includes the subject matter of example 13, wherein the determining of the one of the protected data enclaves that contains the record, the sending the one or more second requests, and sending the record to the requester are performed without the processor being able to determine the record that was requested and without the processor being able to determine the protected data enclave in which the record is stored.

Example 15 includes the subject matter of example 11, further including determining a size of the database and determining a number of the protected data enclaves to store the copy of the data based on a threshold amount of data that can be protected by one of the trusted processing units.

Example 16 includes the subject matter of example 11, in which generating a first one of the data enclaves includes encrypting a portion of the data using a second one of the trusted processing units; and storing the encrypted data in a first memory, the portion of the data in the first memory being accessible only to the second one of the trusted processing units.

Example 17 includes the subject matter of example 11, in which the protected data enclaves include an entirety of the database.

Example 18 includes the subject matter of example 11, further including generating a protected hashing enclave at a second one of the trusted processing units, the protected hashing enclave indicating assignments of the data to ones of the protected data enclaves.

Example 19 includes the subject matter of example 18, in which determining which one of the protected data enclaves contains the record includes performing a hash function on the first request to generate a hash value and looking up the hash value in the protected hashing enclave to determine the one of the protected data enclaves contains the record.

Example 20 includes the subject matter of example 18, in which determining which one of the protected data enclaves contains the record includes performing a hash function on the first request to generate a hash value and looking up the hash value in the protected hashing enclave to determine which of two trusted processing units is in a path to the one of the protected data enclaves that contains the record.

Example 21 includes the subject matter of example 18, further including configuring the trusted processing units in a tree structure in which ones of the trusted processing units that correspond to the ones of the protected data enclaves are leaf nodes of the tree structure and the second one of the trusted processing units that corresponds to the protected hashing enclave is a branch node.

Example 22 is a tangible computer readable medium including computer readable instructions which, when executed, cause a first processor to at least: generate protected data enclaves to store data within trusted execution environments, each of the protected data enclaves being accessible only by a corresponding one of the trusted execution environments in which the protected data enclave exists; in response to receiving a first request for a record in the data at a first one of the trusted execution environments, determine which one of the protected data enclaves contains the record; send second requests between trusted execution environments to retrieve the record from the determined one of the protected data enclaves; send dummy requests to the ones of the trusted execution environments that correspond to ones of the protected data enclaves that do not contain the record; and send the record to a requester.

Example 23 includes the subject matter of in example 22, in which the data is a copy of second data stored in a database, and the second data is split between the protected data enclaves to store the data in the protected data enclaves.

Example 24 includes the subject matter of in example 23, in which the instructions are further to cause the first processor to determine a size of the second data and determine a number of the protected data enclaves to store the data based on comparing the size of the second data to a threshold amount of data that can be protected by one of the trusted execution environments.

Example 25 includes the subject matter of example 23, in which the database is stored on a computing device having a second processor, and the instructions cause the first processor to generate the protected data enclaves by generating the protected data enclaves to prevent access by the second processor to portions of memory in which the protected data enclaves are stored.

Example 26 includes the subject matter of example 25, in which the instructions cause the first processor to determine the one of the protected data enclaves that contains the record, send the one or more second requests, and send the record to the requester without the second processor being able to determine the record that was requested and without the second processor being able to determine the protected data enclave in which the record is stored.

Example 27 includes the subject matter of example 23, in which the plurality of the protected data enclaves includes an entirety of the database.

Example 28 includes the subject matter of example 22, in which the instructions cause the first processor to generate a first one of the data enclaves by encrypting a portion of the data using a first one of the trusted execution environments and storing the encrypted data in a first memory, the portion of the data in the first memory being accessible in decrypted form only to the first one of the trusted execution environments.

Example 29 includes the subject matter of example 22, wherein the instructions further cause the first processor to generate a protected hashing enclave at a second one of the trusted execution environments, the protected hashing enclave indicating assignments of the data to ones of the protected data enclaves.

Example 30 includes the subject matter of example 29, in which the instructions cause the first processor to determine which one of the protected data enclaves contains the record by performing a hash function on the first request to generate a hash value and looking up the hash value in the protected hashing enclave to determine the one of the protected data enclaves contains the record.

Example 31 includes the subject matter of example 29, in which the instructions cause the first processor to determine which one of the protected data enclaves contains the record by performing a hash function on the first request to generate a hash value and looking up the hash value in the protected hashing enclave to determine which of two trusted execution environments is in a path to the one of the protected data enclaves that contains the record.

Example 32 includes the subject matter of example 29, in which the instructions further cause the first processor to configure the trusted execution environments in a tree structure in which ones of the trusted execution environments that correspond to the ones of the protected data enclaves are leaf nodes of the tree structure and the second one of the trusted execution environments that corresponds to the protected hashing enclave is a branch node.

Example 33 is an apparatus, including: a processor to execute first code; a computer readable memory to implement a protected data enclave; a data enclave generator to instantiate the protected data enclave in the memory and to store data in the protected data enclave, the protected data enclave not being accessible to the processor or the first code; and a record retriever to: access a record in the protected data enclave in response to receiving a request for a record in the data; and sending a response to a requester, the response including the record, such that the request and the response are not accessible to the processor.

Example 34 includes the subject matter of example 33, in which the data enclave generator encrypts the data.

Example 35 includes the subject matter of example 33, in which the processor is untrusted, and the data enclave generator stores the protected data enclave in the computer readable memory.

Example 36 includes the subject matter of example 33, in which the record retriever decrypts the request.

Example 37 includes the subject matter of example 33, in which the record retriever encrypts the response.

Example 38 is a method that includes determining a size of a database containing data; generating, a using trusted processing unit, a protected data enclave to store the data when the size of the database is less than a threshold size, the protected data enclave being accessible only by the trusted processing unit that generated the protected data enclave; in response to receiving a request for a record in the data at the trusted processing unit, accessing the record in the protected data enclave; and sending the record to a requester.

Example 39 includes the subject matter of example 38, in which the generating the protected data enclave includes encrypting the data.

Example 40 includes the subject matter of example 38, further including storing the protected data enclave in a memory that is shared with an untrusted processing unit.

Example 41 includes the subject matter of example 38, further including decrypting the request.

Example 42 includes the subject matter of example 38, in which the sending of the record to the requester includes encrypting a response to the request, the response containing the record, and sending the response to the requester.

Example 43 is a tangible computer readable storage medium including first computer readable instructions which, when executed, cause a processor to at least: determine a size of a database containing data; generate, using a trusted execution environment, a protected data enclave to store the data when the size of the database is less than a threshold size, the protected data enclave being accessible only by the trusted execution environment; in response to receiving a request for a record in the data, access the record in the protected data enclave; and send the record to a requester.

Example 44 includes the subject matter of in example 43, in which the first instructions cause the processor to generate the protected data enclave by encrypting the data.

Example 45 includes the subject matter of in example 43, in which the processor is an untrusted processor, and the first instructions further cause the processor to store the protected data enclave in a memory that is shared with second instructions executed by the untrusted processing unit.

Example 46 includes the subject matter of example 43, in which the first instructions further cause the processor to decrypt the request.

Example 47 includes the subject matter of example 43, in which the first instructions further cause the processor to encrypt a response to the request, the response containing the record, and send the response to the requester.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A first trusted hardware processing unit comprising:
   a protected data enclave to store a first portion of data such that entities other than the first trusted hardware processing unit are unable to access the first portion of the data;
   a request processor to:
      determine that a data element specified in a first request from an entity is stored in a second trusted hardware processing unit, the second trusted hardware processing unit to store a second portion of the data including the data element such that entities other than the second trusted hardware processing unit are unable to access the second portion of the data;
      send an encrypted request for the data element to the second trusted hardware processing unit;
      send an encrypted dummy request to a third trusted hardware processing unit;
      determine whether an encrypted dummy response has been received from the third trusted hardware processing unit in response to the encrypted dummy request, the encrypted dummy response not including the data element;
      determine whether an encrypted response including the data element has been received from the second trusted hardware processing unit in response to the encrypted request, a presence of the encrypted dummy request, the encrypted dummy response, the encrypted request and the encrypted response to prevent identification of which of the second and third trusted hardware processing units stores the data element by a third party observing network signaling; and
      send the data element to the entity.

2. The first trusted hardware processing unit as defined in claim 1, wherein the encrypted dummy request includes a first dummy indicator and the encrypted dummy response includes a second dummy indicator.

3. The first trusted hardware processing unit as defined in claim 1, wherein the data element is a first data element, and the encrypted dummy request specifies a second data element stored in the third trusted hardware processing unit.

4. The first trusted hardware processing unit as defined in claim 1, wherein the request processor is to request the data element from the second trusted hardware processing unit such that the first trusted hardware processing unit and the second trusted hardware processing unit can identify the data element that is requested, but the third party and the third trusted processing unit cannot identify the data element.

5. The first trusted hardware processing unit as defined in claim 1, further including a protected hashing enclave to sort data into the first portion and the second portion, the first portion to be stored in the protected data enclave and the second portion to be stored in the second trusted hardware processing unit.

6. The first trusted hardware processing unit as defined in claim 5, wherein the protected hashing enclave is to perform a hash function on the data element specified in the first request and to determine whether a result of the hash function corresponds to the first portion or the second portion.

7. The first trusted hardware processing unit as defined in claim 1, further including a data enclave generator to generate the protected data enclave.

8. A first trusted hardware processing unit, comprising:
   means for storing a first portion of data such that entities other than the first trusted hardware processing unit are unable to access the first portion of the data in the first trusted hardware processing unit; and
   means for processing a request for a data element from an entity, the means for processing to:
      determine that the data element is stored in a second trusted hardware processing unit, the second trusted hardware processing unit to store a second portion of the data including the data element such that entities other than the second trusted hardware processing unit are unable to access the second portion of the data;
      transmit an encrypted request for the data element to the second trusted hardware processing unit; and
      transmit an encrypted dummy request to a third trusted hardware processing unit;
      determine whether an encrypted dummy response has been received from the third trusted hardware processing unit in response to the encrypted dummy request, the encrypted dummy response not including the data element;
      determine whether an encrypted response including the data element has been received from the second trusted hardware processing unit in response to the encrypted request, a presence of the encrypted dummy request, the encrypted dummy response, the encrypted request and the encrypted response to prevent identification of which of the second and third trusted hardware processing units stores the data element by a third party observing network signaling; and
      transmit the data element to the entity.

9. The first trusted hardware processing unit as defined in claim 8, wherein the encrypted dummy request includes a first dummy indicator and the encrypted dummy response includes a second dummy indicator.

10. The first trusted hardware processing unit as defined in claim 8, wherein the data element is a first data element, and the encrypted dummy request specifies a second data element stored in the third trusted hardware processing unit.

11. The first trusted hardware processing unit as defined in claim 8, wherein the means for processing is to request the data element from the second trusted hardware processing unit such that the first trusted hardware processing unit and the second trusted hardware processing unit can identify the data element that is requested, but the third party observer and the third trusted processing unit cannot identify the data element.

12. The first trusted hardware processing unit as defined in claim 8, further including means for sorting the data into the first portion and the second portion, the first portion to be stored in the means for storing and the second portion to be stored in the second trusted hardware processing unit.

13. The first trusted hardware processing unit as defined in claim 12, wherein the means for sorting is further to perform a hash function on the data element specified in the request and to determine whether a result of the hash function corresponds to the first portion or the second portion.

14. The first trusted hardware processing unit as defined in claim 8, further including means for generating the means for storing.

15. A tangible machine readable medium comprising instructions which, when executed, cause a processor of a first trusted hardware processing unit storing a first portion of data such that entities other than the first trusted hardware processing unit are unable to access the first portion of the data to at least:
   determine that a data element specified in a first request from an entity is stored in a second trusted hardware processing unit, the second trusted hardware processing unit having a second portion of the data including the data element such that entities other than the second trusted hardware processing unit are unable to access the second portion of the data;
   initiate transmission of an encrypted request for the data element to the second trusted hardware processing unit;
   initiate transmission of an encrypted dummy request to a third trusted hardware processing unit;
   determine whether an encrypted dummy response has been received from the third trusted hardware processing unit in response to the encrypted dummy request, the encrypted dummy response not including the data element;
   determine whether an encrypted response including the data element has been received from the second trusted hardware processing unit in response to the encrypted request, a presence of the encrypted dummy request, the encrypted dummy response, the encrypted request and the encrypted response to prevent identification of which of the second and third trusted hardware processing units stores the data element by a third party observing network signaling; and
   initiate transmission of the data element to the entity.

16. The tangible machine readable medium as defined in claim 15, wherein the first trusted hardware processing unit and the second trusted hardware processing unit can identify the data element that is requested in the encrypted request, but the third party observer and the third trusted processing unit cannot identify the data element.

17. The tangible machine readable medium as defined in claim 15, further including performing a hash function on the data element specified in the first request to determine whether a result of the hash function corresponds to the first portion or the second portion.

18. A method executed by a first trusted hardware processing unit, the method comprising:
   storing, by executing an instruction with a processor, a first portion of data such that entities other than the first trusted hardware processing unit are unable to access the first portion of the data;
   determining, by executing an instruction with the processor, that a data element specified in a first request from an entity is stored in a second trusted hardware processing unit, the second trusted hardware processing unit storing a second portion of the data including the data element such that entities other than the second trusted hardware processing unit are unable to access the second portion of the data;
   transmitting an encrypted request for the data element to the second trusted hardware processing unit;
   transmitting an encrypted dummy request to a third trusted hardware processing unit;
   determining, by executing an instruction with the processor, whether an encrypted dummy response has been received from the third trusted hardware processing unit in response to the encrypted dummy request, the encrypted dummy response not including the data element;

determining, by executing an instruction with the processor, whether an encrypted response including the data element has been received from the second trusted hardware processing unit in response to the encrypted request, a presence of the encrypted dummy request, the encrypted dummy response, the encrypted request and the encrypted response to prevent identification of which of the second and third trusted hardware processing units stores the data element by a third party observing network signaling; and transmitting the data element from the first trusted hardware processing unit to the entity.

19. The method as defined in claim 18, wherein the first trusted hardware processing unit and the second trusted hardware processing unit can identify the data element that is requested in the encrypted request, but the third party observer and the third trusted processing unit cannot identify the data element.

20. The method as defined in claim 18, further including performing a hash function on the data element specified in the first request to determine whether a result of the hash function corresponds to the first portion or the second portion.

* * * * *